United States Patent
Cohen-Tannoudji et al.

(10) Patent No.: US 10,108,027 B2
(45) Date of Patent: Oct. 23, 2018

(54) METHOD OF DETERMINING THE CONFIGURATION OF AN OPHTHALMIC FILTER

(71) Applicants: ESSILOR INTERNATIONAL (COMPAGNIE GÉNÉRALE D'OPTIQUE, Charenton-le-pont (FR); UNIVERSITE PARIS 6 PIERRE ET MARIE CURIE, Paris (FR)

(72) Inventors: Denis Cohen-Tannoudji, Charenton-le-Pont (FR); Coralie Barrau, Charenton-le-Pont (FR); Thierry Pierre Villette, Charenton-le-Pont (FR); Jose-Alain Sahel, Paris (FR); Serge Picaud, Avon (FR); Emilie Arnault, Ivry sur Seine (FR)

(73) Assignees: ESSILOR INTERNATIONAL, Charenton-le-pont (FR); UNIVERSITE PARIS 6 PIERRE ET MARIE CURIE, Paris (FR)

( * ) Notice: Subject to any disclaimer, the term of this patent is extended or adjusted under 35 U.S.C. 154(b) by 0 days.

(21) Appl. No.: 14/363,948

(22) PCT Filed: Dec. 6, 2012

(86) PCT No.: PCT/IB2012/057013
§ 371 (c)(1),
(2) Date: Jun. 9, 2014

(87) PCT Pub. No.: WO2013/084176
PCT Pub. Date: Jun. 13, 2013

(65) Prior Publication Data
US 2014/0320806 A1    Oct. 30, 2014

(30) Foreign Application Priority Data
Dec. 8, 2011  (EP) .................................. 11306630

(51) Int. Cl.
G02C 13/00      (2006.01)
G02C 7/10       (2006.01)

(52) U.S. Cl.
CPC ........... G02C 13/005 (2013.01); G02C 7/104 (2013.01); G02C 7/105 (2013.01); G02C 7/107 (2013.01); G02C 7/108 (2013.01)

(58) Field of Classification Search
CPC .................................. A61B 3/14; G02C 7/10
(Continued)

(56) References Cited

U.S. PATENT DOCUMENTS 4,786,125 A    11/1988  Magarinos et al.
4,846,913 A *   7/1989  Frieder .................. G02C 7/086
                                                 156/242

(Continued)

FOREIGN PATENT DOCUMENTS

CA    2746282    6/2010
CN    2713500    7/2005

(Continued)

OTHER PUBLICATIONS

International Search Report, dated Feb. 26, 2013, from corresponding PCT application.

(Continued)

*Primary Examiner* — Bumsuk Won
*Assistant Examiner* — Wen Huang
(74) *Attorney, Agent, or Firm* — Young & Thompson

(57) ABSTRACT

Method of determining configuration of interferential filtering elements for an optical device having an optical substrate for a user, includes:
  providing a first set of parameters representative of at least one main line of sight of the user;
  determining a first selected range of angles of incidence based on the first parameters;

(Continued)

providing a second set of parameters characterizing, for the user, a range of wavelengths to be at least partially inhibited;

determining a first selected range of wavelengths of incident light to be at least partially inhibited, based on the second parameters; and configuring a first selective interferential filtering element and a first zone of a surface of the optical substrate based on the first selected range of angles of incidence and wavelengths such that the first selective interferential filtering elements inhibit, at a first rate of rejection, transmission of the first selected range of wavelengths of incident light.

31 Claims, 19 Drawing Sheets

(58) Field of Classification Search
USPC ............................. 351/200–246; 3/200–246
See application file for complete search history.

(56) References Cited

U.S. PATENT DOCUMENTS

| | | | |
|---|---|---|---|
| 5,360,010 A * | 11/1994 | Applegate | A61B 3/1241 351/221 |
| 6,955,430 B2 | 10/2005 | Pratt | |
| 7,854,505 B2 | 12/2010 | Cunningham et al. | |
| 2008/0113935 A1 * | 5/2008 | Yedgar | A61K 9/0048 514/56 |
| 2009/0323014 A1 | 12/2009 | Cunningham et al. | |
| 2010/0053550 A1 * | 3/2010 | Giraudet | G02C 5/001 351/159.65 |
| 2010/0149483 A1 * | 6/2010 | Chiavetta, III | 351/163 |
| 2010/0149493 A1 | 6/2010 | Penn et al. | |
| 2011/0051091 A1 * | 3/2011 | Song | G02B 27/0172 353/7 |

FOREIGN PATENT DOCUMENTS

| | | |
|---|---|---|
| CN | 101776776 | 7/2010 |
| CN | 101960380 | 1/2011 |
| DE | 38 37 008 A1 | 5/1990 |
| DE | 3837998 | 5/1990 |
| FR | 2 551 224 A1 | 3/1985 |
| JP | 52-109848 U | 8/1977 |
| WO | 2010111499 | 9/2010 |

OTHER PUBLICATIONS

Chinese Office Action, dated Dec. 22, 2014, in corresponding Chinese Patent Application No. 201280060062.0.

Chinese Office Action, dated Jan. 23, 2015, in corresponding Chinese Patent Application No. 201280060111.0.

* cited by examiner

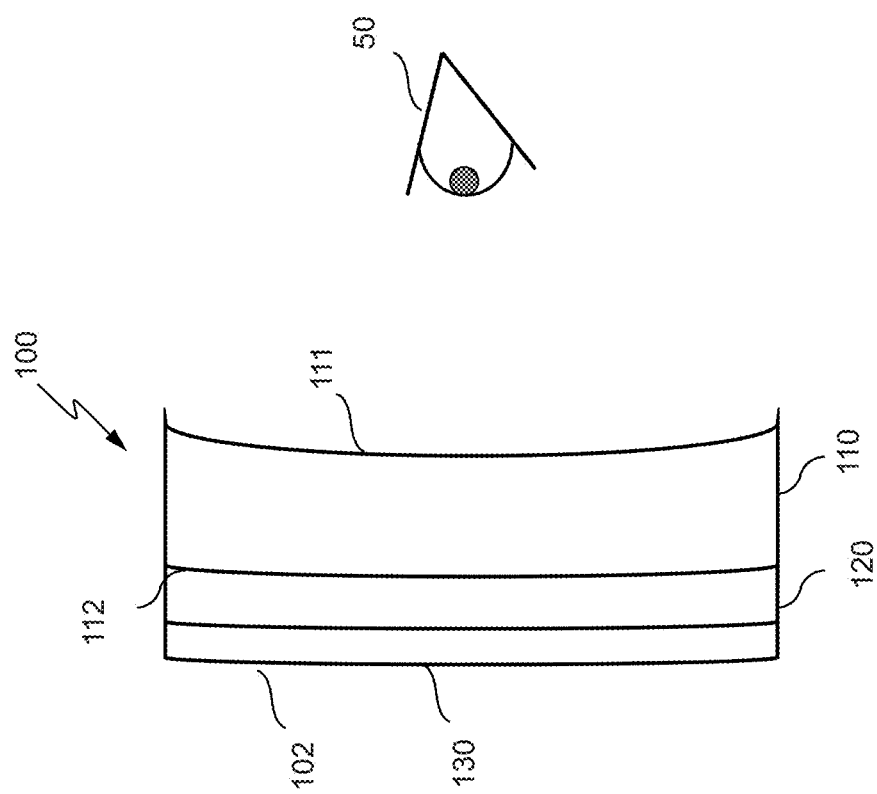

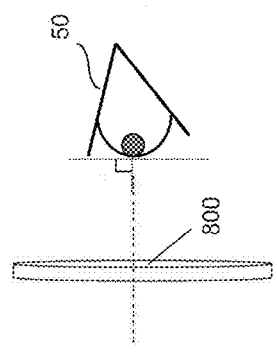
FIG.1B
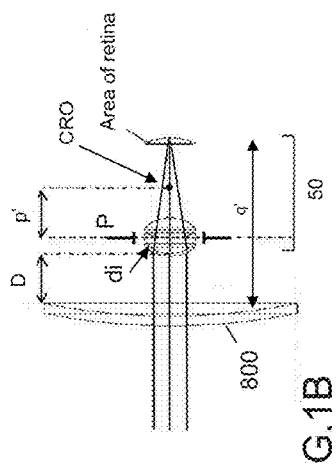
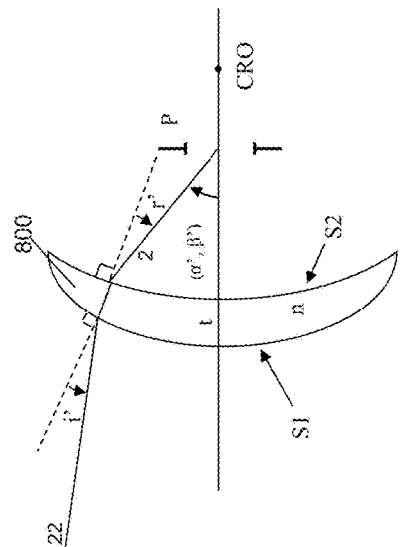
FIG.1F
FIG.1E

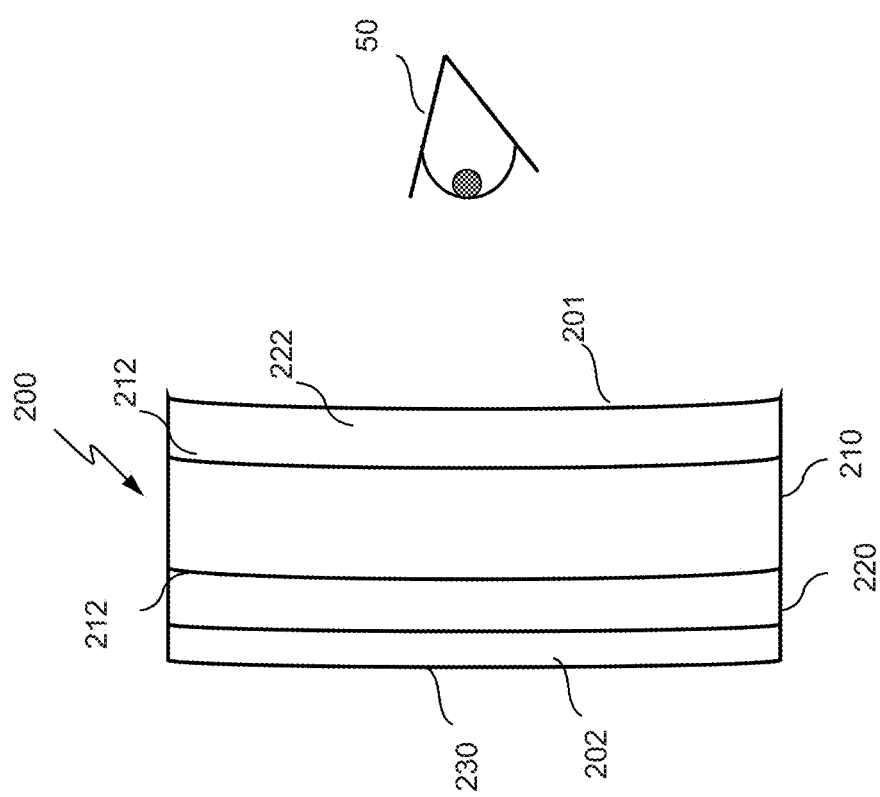

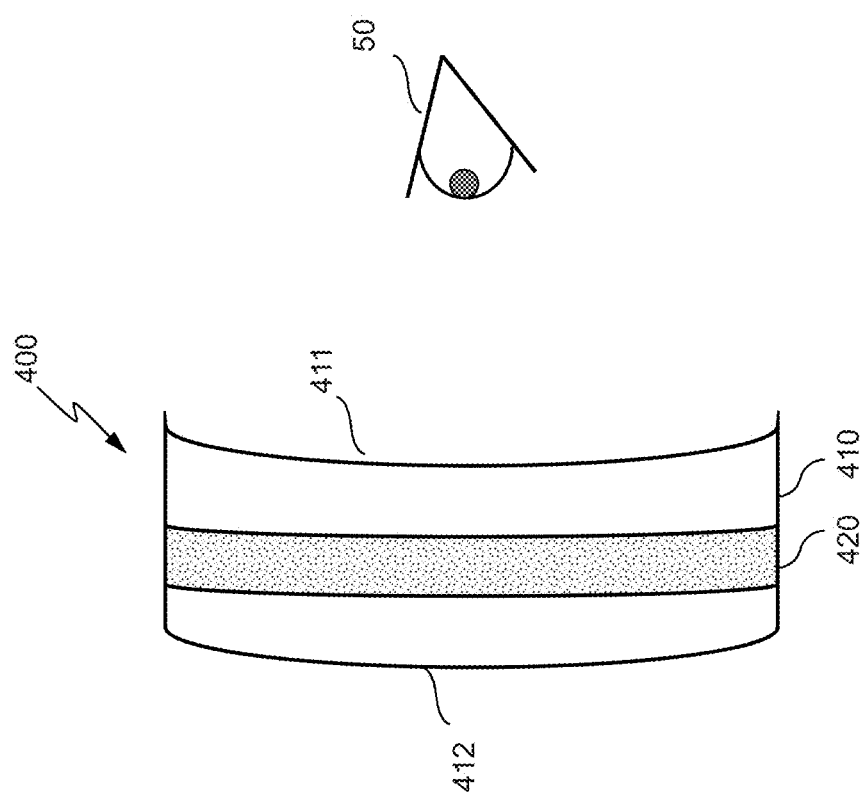

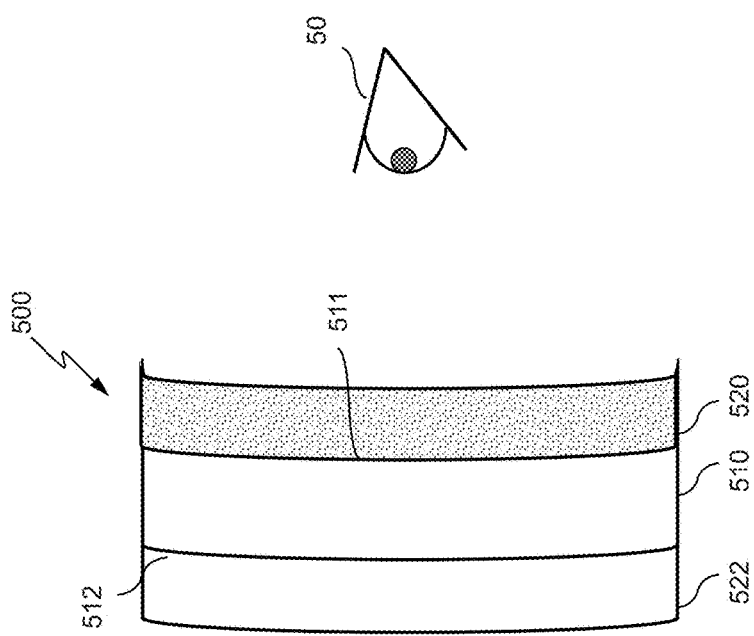

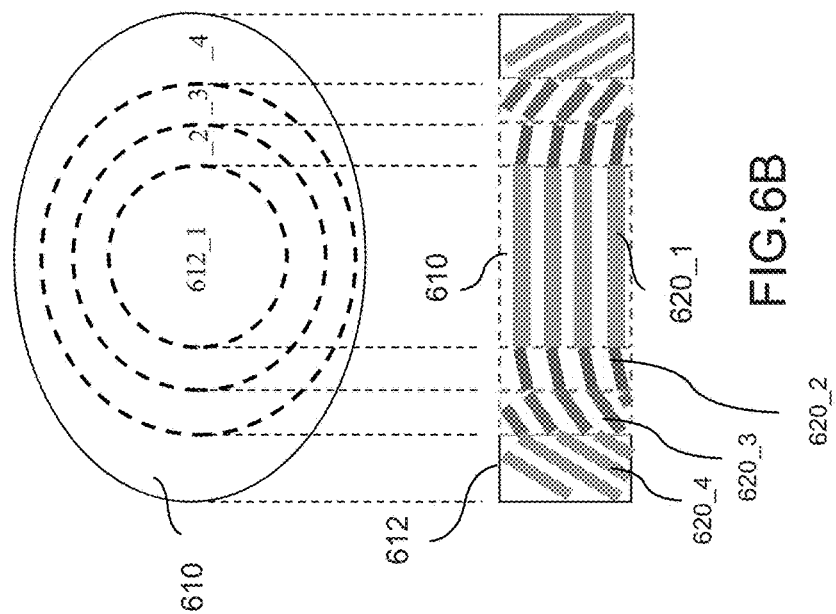
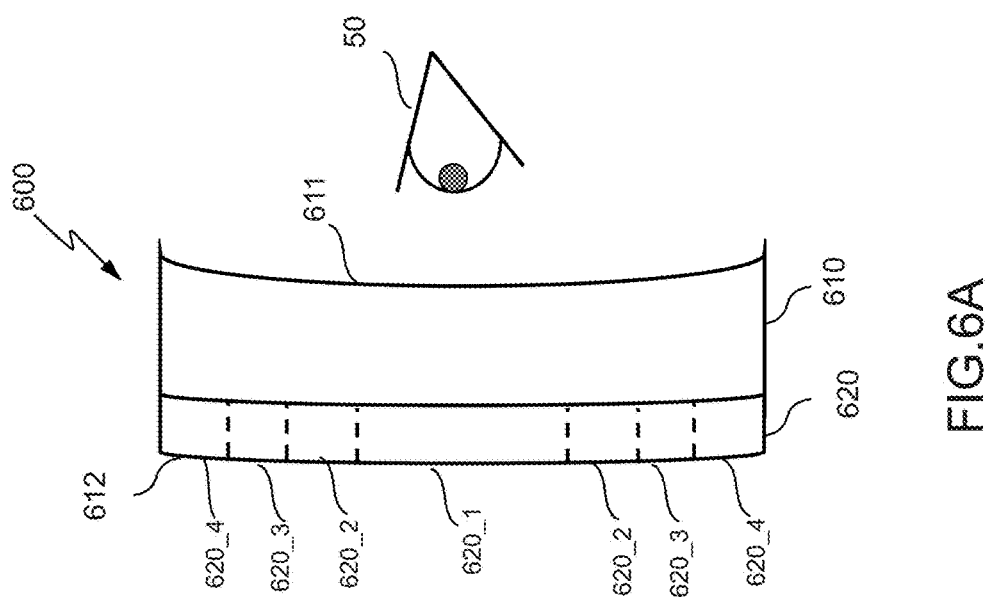
FIG.6B
FIG.6A

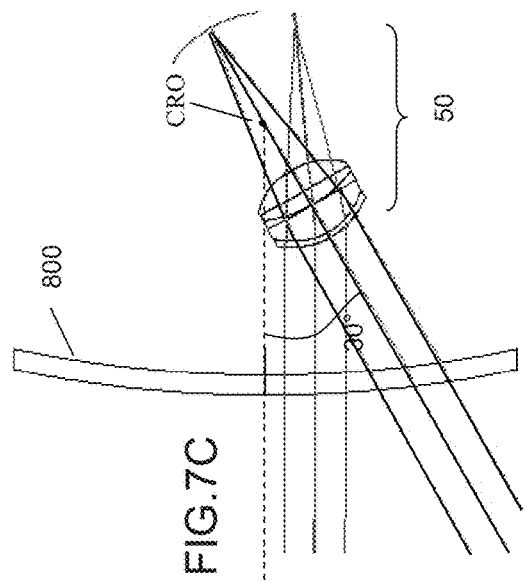
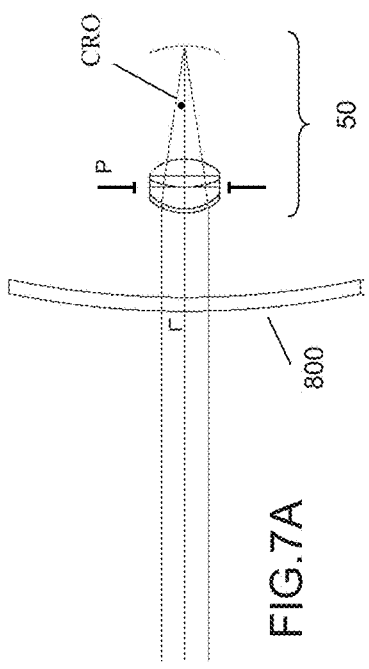
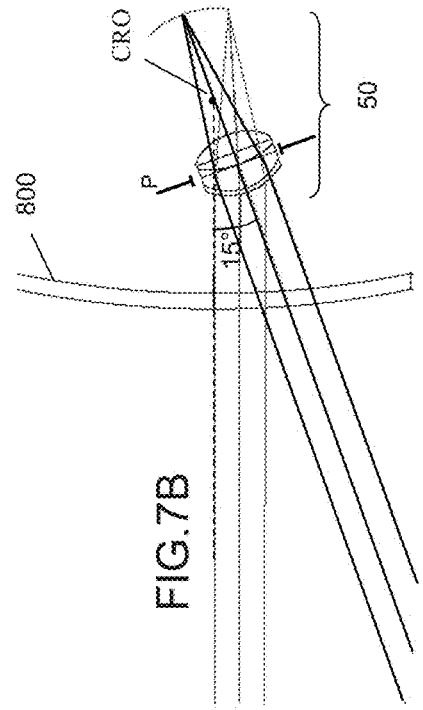

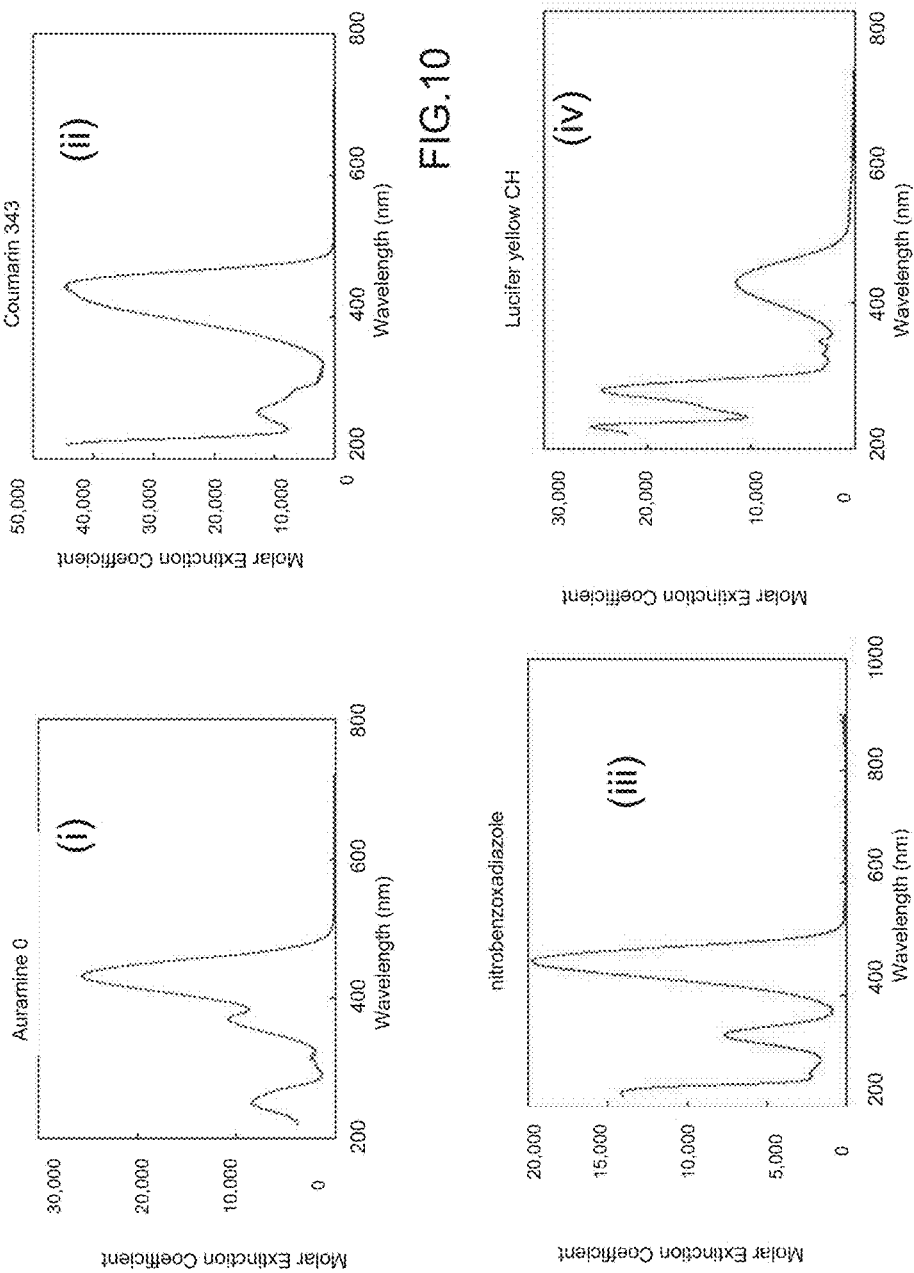

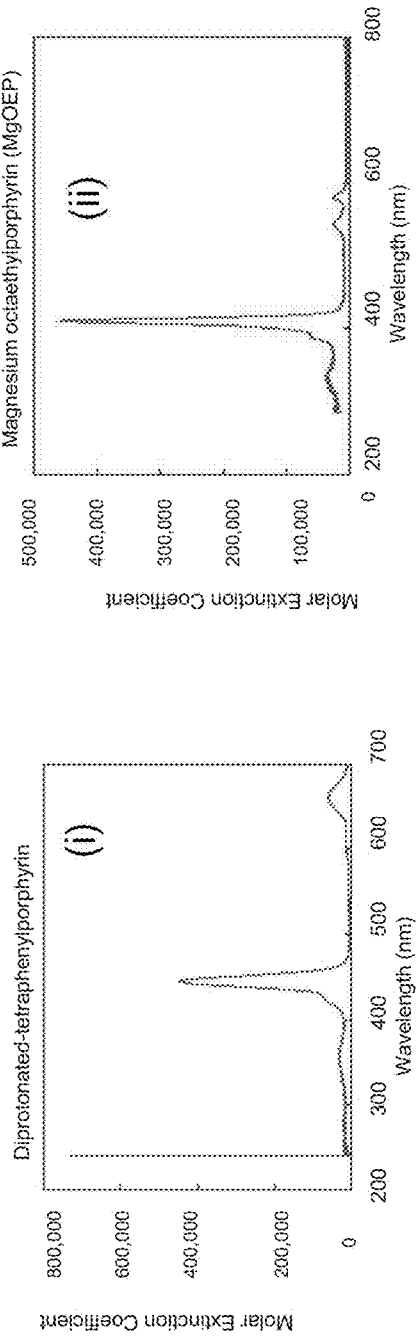
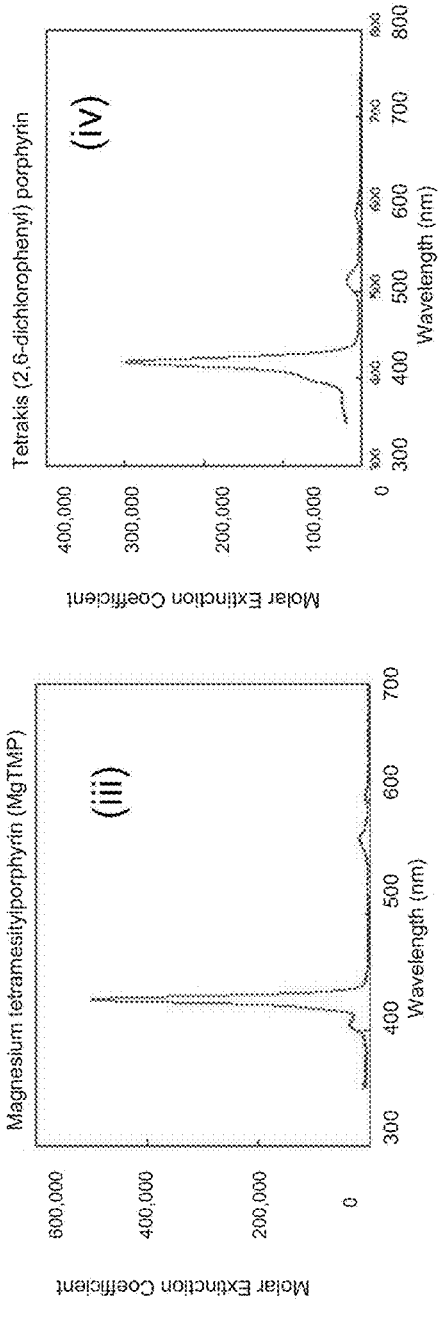
FIG. 11

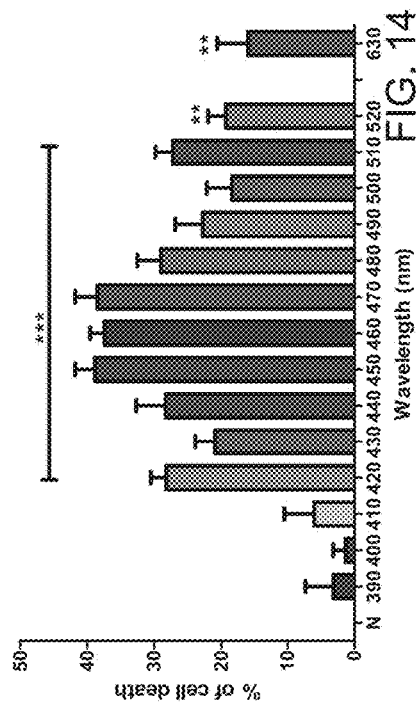
FIG. 13
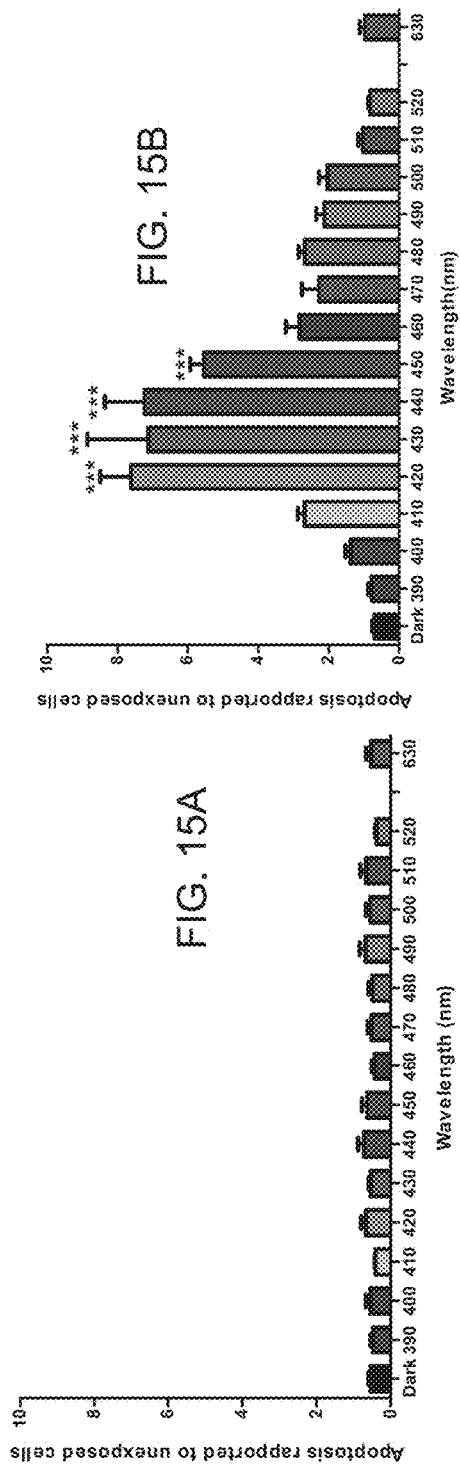
FIG. 14
FIG. 15A
FIG. 15B

METHOD OF DETERMINING THE CONFIGURATION OF AN OPHTHALMIC FILTER

FIELD OF THE INVENTION

The present invention relates in general to an optical device comprising an optical substrate and to the use of such an optical device. Embodiments of the invention relate to a method of determining a configuration for an optical device, a method of manufacturing an optical device and use of an optical device.

BACKGROUND OF THE INVENTION

The electromagnetic spectrum covers a wide range of wavelengths, among which are wavelengths visible to the human eye often referred to as the visible spectrum covering a range of from 380 nm to 780 nm. Some wavelengths of the electromagnetic spectrum including those of the visible spectrum provide harmful effects, while others are known to have beneficial effects on the eye. Some wavelengths of the visible spectrum are also known to induce a range of neuroendocrine, physiological and behavioural responses known as non-image-forming (NIF) responses.

The vertebrate retina is a light-sensitive tissue lining the inner surface of the eye. This tissue has four main layers from the choroid to the vitreous humour: the retinal pigment epithelium (hereinafter referred to as "RPE"), the photoreceptor layer (including rods and cones), the inner nuclear layer with bipolar and amacrine cells, and finally, the ganglion cell layer which contains some intrinsically photosensitive ganglion cells (1% of retinal ganglion cells (hereinafter referred to as "RGC")). This last cell type is important for circadian photoentrainment (biological rhythms) and pupillary function.

Neural signals initiate in the rods and cones, and undergo complex processing by other neurons of the retina. The output from the processing takes the form of action potentials in retinal ganglion cells, the axons of which form the optic nerve. Several important features of visual perception can be traced to the retinal encoding and processing of light.

Photobiology, which is the study of the biological effect of light, has established that a portion of the electromagnetic spectrum provides beneficial effects for good health, including visual perception and circadian functions. However, it has also established the importance of protecting the eyes against harmful radiation, such as ultraviolet (UV) rays. Visible light, even of ordinary everyday intensity, may cause retinal damage or contribute to the development of early and late Age-Related Maculopathy (ARM), such as Age-related Macular Degeneration (AMD). There are indications in some epidemiological studies that level of exposure to sunlight may be associated with the development of AMD: Tomany S C et al. Sunlight and the 10-Year Incidence of Age-Related Maculopathy. The Beaver Dam Eye Study. *Arch Ophthalmol.* 2004; 122:750-757.

Other pathologies are related to exposure to light. For example, the production of melatonin in circadian rhythms is known to be regulated by exposure to light. As a consequence, specific light modification in the environment might impact synchronisation of the body's biological clock. Migraines are associated with photophobia which is an abnormal intolerance to light stimulus of the visual system and epilepsy can be affected by the presence of light.

Ophthalmic devices that filter out with low selectivity harmful UV radiations are widely used. For example, sunglasses are designed to provide solar protection by protecting the eye against the harmful effects of UVA and UVB rays. Intraocular lenses (IDLs) with UV filters were introduced in the 1990s; these being mainly post-cataract surgery implants replacing the crystalline lens.

The present invention has been devised with the foregoing in mind.

SUMMARY OF THE INVENTION

According to a first aspect of the invention, there is provided a method of determining configuration of interferential filtering means for an optical device comprising an optical substrate for a user, the method comprising: providing a first set of parameters representative of at least one main line of sight of the user, the distance between the optical substrate and an eye of the user, a size of a retina area and/or the pupil size of the eye of the user; determining a first selected range of angles of incidence based on the first set of parameters; providing a second set of parameters characterising, for the user, a range of wavelengths to be inhibited, at least partially; determining a first selected range of wavelengths of incident light to be inhibited, at least partially, based on the second set of parameters; and configuring a first selective interferential filtering means and a first zone of a surface of the optical substrate based on the first selected range of angles of incidence and the first selected range of wavelengths such that the first selective interferential filtering means is operable to inhibit, at a first rate of rejection, transmission of the first selected range of wavelengths of incident light, incident on the first zone within the first selected range of angles of incidence.

In this way an optical device may be customised to one or more users and the envisaged utilisation. An optical device is thus provided with selective interferential filtering means providing selective inhibition of the transmission of incident light in a spectral band of choice and configured to ensure a better control of the spectral response obtained when non-collimated incident light reaches a defined geometrical zone of the optical substrate. Angular sensitivity of the interferential filter is first taken into account by considering a determined range of angles of incidences, referred to as the cone of incidence angles, to design the filters, and not only a unique incidence angle.

The selectivity and the control of angular sensitivity provided by the designed interferential filtering means minimises distortion of colour perception, perturbation of scotopic vision and limits the impact on non visual functions of the eye. In addition the yellowish effect provided by a broad long pass absorptive filter of blue light can be avoided.

In an embodiment, the first and/or second set of parameters further comprises physiological parameters of the user such as whether the user suffers from a deterioration of the eye or is to be protected from a deterioration of the eye.

The optical device may be designed according to the level of preventive needs of the user and configured to particular disease or disease s and/or stages of the disease or diseases suffered by the subject.

For example the deterioration of the eye may be in particular due to a degenerative process such as glaucoma, diabetic retinopathy, Leber's hereditary optic neuropathy, Age related Macular Degeneration (AMD), Stargardt disease, retinitis pigmentosa or Best's disease.

The selective interferential filtering means may be adapted according to the disease or diseases or the stage of disease or diseases suffered by a user. For example, the area of the retina to be protected may change according to the stage of the disease. Thus, the range of angles of incidence on the surface of the optical substrate may be configured accordingly. In the case of an advanced AMD, clinical data showed that an angular cone of 25° centered on the fovea could be hurt by the disease.

In one particular embodiment of the invention, the method includes providing at least one further first set of parameters defining at least one further main line of sight of the user, the distance between the optical substrate and the eye of the user, the size of a retina area centered on the fovea of the eye of the user and/or the pupil size of the eye of the user; determining, for each further first set of parameters, a respective selected range of angles of incidence based on the respective further first set of parameters; providing at least one further second set of parameters characterising, for the user, at least one further range of wavelengths to be inhibited, at least partially; determining, for each further second set of parameters, a respective selected range of wavelengths of incident light to be inhibited, at least partially, based on the respective further second set of parameters; and for each further first set of parameters and further second set of parameters: configuring a respective further selective interferential filtering means and a respective further zone of the surface of the optical substrate based on the respective selected range of angles of incidence and the respective selected range of wavelengths such that the respective further selective interferential filtering means is operable to inhibit, at a respective further rate of rejection, transmission of the respective selected range of wavelengths of incident light, incident on the respective further zone within the respective selected range of angles of incidence.

In this way multiple zones of the optical substrate may be configured according to lines of sight and the users' requirements.

In one embodiment each respective selected range of angles of incidence is different to the first selected range of angles of incidence. Each respective selective range of wavelengths may be substantially the same as the first selected range of wavelengths. In this way different cones of incident angles according to the geometrical zone can be configured to provide the same controlled spectral response over the surface of the optical substrate quasi-independently of the angle of incidence.

In one embodiment the first rate of rejection is in a range of from 10% to 100%, preferably 30% to 100%. The device may thus be configured to the user and the envisaged use.

Each further rate of rejection may be configured to be different to the first rate of rejection. For example the rejection rate may decrease with distance of the zone from the general centre of the optical substrate. In this way the distortion of colour perception may be minimised.

In one embodiment, the optical device is an optical lens, and the method includes configuring the first zone to correspond to a distance vision portion of the optical lens for a wearer and a further zone to correspond to a near vision portion of the optical lens for a wearer, In one embodiment the method includes configuring each selective interferential filtering means to inhibit transmission of incident light by at least one of reflection, refraction and diffraction.

In one embodiment, the first selected range of wavelengths has a bandwidth in a range of from 20 nm to 60 nm, preferably of from 20 nm to 25 nm centered on a wavelength of substantially 435 nm, 445 nm or 460 nm, and the first rate of rejection is in a range of from 10 to 50%, preferably of from 30 to 50%.

This enables selective filtering of wavelengths which have been shown by innovative studies of the inventors to be harmful on cell models for retinal diseases such as AMD, Stargardt disease, retinitis pigmentosa, Best's disease, glaucoma, diabetic retinopathy or Leber's hereditary optic neuropathy.

Indeed, when investigating the phototoxicity on RPE cells using a primary cell model of AMD, Stargardt disease, retinitis pigmentosa, Best's disease, it was discovered by the inventors that light was toxic to RPE cells at wavelengths of visible light centered at around 435 nm. In experimental studies, toxicity to RPE cells was demonstrated for 10 nm bandwidths of light stretching from 415 nm to 455 nm. Surprisingly, when retinal ganglion cells, which degenerate in glaucoma and diabetic retinopathy, were exposed to light, it was found that they degenerate with light centered at 460 nm with the greatest toxicities being observed between 445 nm and 475 nm. The illustrative experimental studies were carried out using light having a bandwidth of 10 nm. Consequently one or more embodiments of the invention may provide an optical device for filtering out target wavelength bands of light centered at 435 nm and/or 460 nm depending on the considered pathologies.

In some embodiments the proposed optical devices may be configured to specifically block target wavelengths bands of visible light having narrow bandwidths. They may have a preventive or therapeutic application in the case of the considered retinal diseases (AMD, Stargardt disease, retinitis pigmentosa, Best's disease, glaucoma, diabetic retinopathy, Leber's hereditary optic neuropathy).

Filtration of narrow bands of light enable the effects of disturbance of colour vision, the impact on scotopic vision and the possible disruption of circadian rhythms to be minimised.

A selective interferential filter means may be configured, for example to selectively inhibit light in a narrow band of wavelengths centered on a wavelength around 435 nm. This range of wavelengths has been shown by the innovative studies, performed by the inventors when investigating the phototoxicity of RPE using a primary cell model of AMD, to exhibit maximum toxicity to diseases such as AMD, Stargardt disease, retinitis pigmentosa, Best's disease.

In another example a selective interferential filtering means may be configured, for example to selectively inhibit light in a narrow band of wavelengths centered on a wavelength around 460 nm. This range of wavelengths has been shown by innovative studies, performed by the inventors when investigating the phototoxicity of RGC using a primary cell model of glaucoma, to exhibit maximum toxicity for diseases such as glaucoma, diabetic retinopathy, Leber's hereditary optic neuropathy.

In another example a selective interferential filtering means may be configured, for example to selectively inhibit light in a broader band of wavelengths centered on a wavelength around 445 nm thereby filtering light which has been shown in studies on the RPE and RGC cellular models to be toxic to the progress of diseases such as glaucoma, diabetic retinopathy, Leber's hereditary optic neuropathy, Age related Macular Degeneration (AMD), Stargardt disease, retinitis pigmentosa or Best's disease.

Moreover, the selective interferential filtering means may be configured, as a dual band filter for selectively inhibiting light in a narrow band of wavelengths centered on a wavelength around 435 nm which has been shown by the cellular model studies to be harmful to the progress of AMD, Stargardt disease, retinitis pigmentosa or Best's disease; and in a narrow band of wavelengths centered on a wavelength around 460 nm which has been shown by the cellular model studies to be harmful to the progress of Glaucoma, Leber's hereditary optic neuropathy or diabetic retinopathy. This embodiment provides increased selectivity thereby limiting the distortion of colour vision and the perturbation of scotopic vision.

In another embodiment, the first selected range of wavelengths has a bandwidth in a range of from 15 nm to 30 nm, preferably 15 nm to 25 nm centered on a wavelength of substantially 435 nm, 445 nm or 460 nm, and the first rate of rejection is in a range of from 60 to 100%, preferably of from 80 to 100%. The increased rate of rejection provides enhance protection, in particular for those suffering from a disease such as AMD, Stargardt disease, retinitis pigmentosa, Best's disease, glaucoma, Leber's hereditary optic neuropathy or diabetic retinopathy, helping to slow down the progress of the disease.

In some embodiments, the optical device may be configured to provide an additional function of inhibiting transmission of light across the entire visible spectrum. In one embodiment the optical device is configured to inhibit transmission of visible light across the entire visible spectrum at an inhibition rate in a range of from 40% to 92%. In one such embodiment the first selected range of wavelengths has a bandwidth in a range of from 25 nm to 60 nm, preferably of from 25 nm to 35 nm centered on a wavelength of substantially 435 nm, 445 nm or 460 nm, and the first rate of rejection is configured to provide at least 5% additional inhibition for the first selected range of wavelengths. The 5% additional inhibition being in addition to the inhibition rate across the entire visible spectrum.

Such a configuration may be used for example in solar protection in preventing the transmission of toxic light in the first selected range of wavelengths to the eye of a user.

In one embodiment the optical device is configured such that the first selected range of wavelengths is of from 465 nm to 495 nm. Thus the device may be used in protecting at least part of an eye of a user suffering from a light induced sleeping disorder.

In another embodiment the optical device is configured such that the first selected range of wavelengths is of from 550 nm to 660 nm. Thus the device may be used in protecting at least part of an eye of a user suffering from a colour vision disorder.

In another embodiment the optical device is configured such that the first selected range of wavelengths is of from 590 nm to 650 nm, preferably 615 nm to 625 nm. Thus the device may be used in protecting at least part of an eye of a user suffering from migraines.

In another embodiment the optical device is configured such that the first selected range of wavelengths is of from 560 nm to 600 nm. Thus the device may be used in protecting at least part of an eye of a user suffering from epilepsy.

A further aspect of the invention provides a method of manufacturing an optical lens, the method comprising the steps of providing a semi-finished optical lens having an unfinished surface and an opposing surface, wherein the unfinished surface is one of a convex surface and a concave surface and the opposing surface is the other of a convex surface and a concave surface; determining a configuration of a selective interferential filtering means for the optical lens for a user; surfacing the unfinished surface; and providing one of the surfaces with the selective interferential filtering means; wherein the step of determining a configuration of the selective interferential filtering means comprises a method of determining configuration of selective interferential filtering means including the steps of providing a first set of parameters representative of at least one main line of sight of the user, the distance between the optical substrate and an eye of the user, a size of a retina area and/or the pupil size of the eye of the user; determining a first selected range of angles of incidence based on the first set of parameters; providing a second set of parameters characterising, for the user, a range of wavelengths to be inhibited, at least partially; determining a first selected range of wavelengths of incident light to be inhibited, at least partially, based on the second set of parameters; and configuring a first selective interferential filtering means and a first zone of a surface of the optical substrate based on the first selected range of angles of incidence and the first selected range of wavelengths such that the first selective interferential filtering means is operable to inhibit, at a first rate of rejection, transmission of the first selected range of wavelengths of incident light, incident on the first zone within the first selected range of angles of incidence.

It will be appreciated that the steps of the method may be performed in any suitable order. For example the unfinished surface may be surfaced before or after one of the surfaces is provided with the selective interferential filtering means. Preferably the unfinished surface is surface prior to the provision of the selective interferential filtering means.

In the context of the present invention the term optical device includes optical lenses comprising an optical substrate such as ophthalmic lenses, contact lenses, intraocular lenses (IOL) etc. The term also covers other optical devices having an optical substrate, such as for example, windows, automotive and aircraft windshields, films, ophthalmic instrumentation, computer monitors, television screens, telephone screens, multimedia display screens, lighted signs, light projectors and light sources, and the like. In the context of the present invention, by "ophthalmic lenses" is meant corrective and non-corrective lenses and also masks and other vision devices intended to be worn in front of the eyes. The ophthalmic lenses can comprise specific functions, for example solar, antireflective, anti-smudge, anti-abrasive, etc.

Parts of some of the methods according to the invention may be computer implemented. Such methods may be implemented in software on a programmable apparatus. They may also be implemented solely in hardware or in software, or in a combination thereof.

Since some embodiments of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:—

FIG. 2 is a schematic diagram of an optical device comprising an optical substrate in accordance with a second embodiment of the invention;

FIG. 4 is a schematic diagram of an optical device comprising an optical substrate in accordance with a fourth embodiment of the invention;

FIG. 5 is a schematic diagram of an optical device comprising an optical substrate in accordance with a fifth embodiment of the invention;

FIGS. 6A to 6C are schematic diagrams of an optical device comprising an optical substrate in accordance with a sixth embodiment of the invention;

FIGS. 7A to 7C are schematic diagrams illustrating examples of lines of sight through an optical lens;

FIGS. 10(i) to 10(viii) graphically illustrate the absorption spectrum of selected dyes and pigments used in selective filters according to some embodiments of the invention;

FIGS. 11(i) to 11(viii) graphically illustrate the absorption spectrum of porphyrins used in selective filters according to some embodiments of the invention;

FIG. 13 graphically illustrates irradiances applied during the in vitro cell exposures for different wavelength bands indicated by their respective central wavelength FIG. 14 graphically illustrates in vitro RGC death after light exposure at different wavelengths; and FIGS. 15A and 15B graphically illustrate in vitro RPE cells death by apoptosis after light exposure at different wavelengths respectively in absence and presence of A2E.

DETAILED DESCRIPTION

Figure 1D:
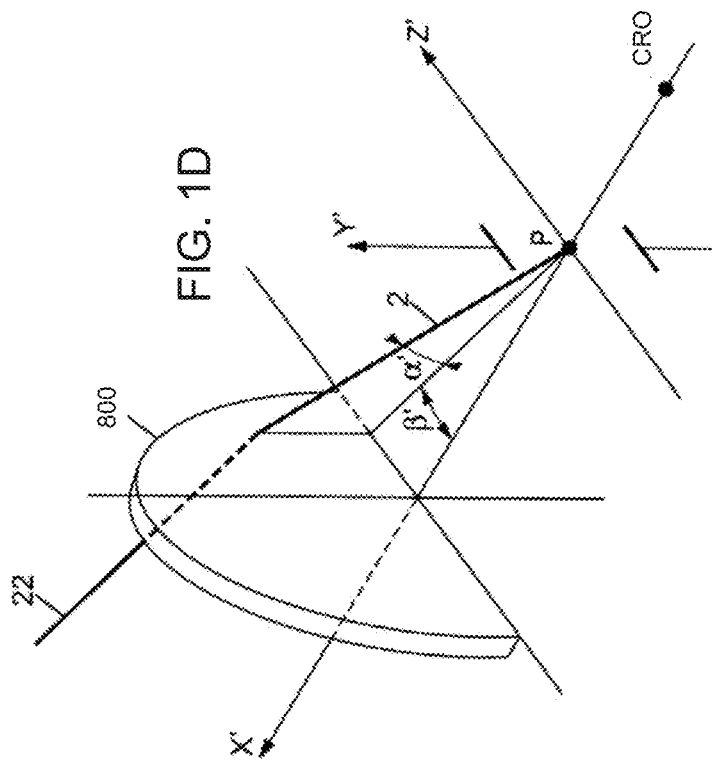
FIG. 1A is a schematic diagram of an optical device comprising an optical substrate in accordance with a first embodiment of the invention.
FIG. 1B schematically illustrates geometrical features of an eye in the context of embodiments of the invention FIGS. 1C and 1D schematically illustrate geometrical parameters related to a line of sight in central vision and peripheral vision respectively.
FIGS. 1E to 1G schematically illustrate the relationship between incident light and lines of sight of a user.

As used herein a filter "selectively inhibits" a range of wavelengths if it inhibits at least some transmission of wavelengths within the range, while having little or no effect on the transmission of visible wavelengths outside the range, unless specifically configured to do so. The term rejection rate or inhibition rate or degree of inhibition refers to the percentage of incident light within one or more selected ranges of wavelengths, which is prevented from being transmitted. The parameter range of wavelengths (target band) or bandwidth may is defined as the Full Width at Half Maximum (FWHM)

An optical device according to a first embodiment of the invention will be described with reference to FIG. 1A. FIG. 1A is a schematic diagram of an optical lens 100 comprising a base optical substrate 110 having a first surface 111 and a second surface 112. In the specific embodiment of an optical lens the first surface 111 is a concave back surface, disposed, in use, proximal to an eye 50 of a user and the second surface 112 is a convex front surface disposed, in use, distal to the eye 50 of the user. The optical lens 100 further comprises a selective interferential filter 120 provided, in this particular embodiment, as a layer, on the front surface 112 of the base optical substrate 110 and shaped to conform with the shape of the front surface 112. In other embodiments the selective interferential filter may be provided, as a layer, or as part of a layer, within the optical substrate 110.

The selective interferential filter 120 operates as a band stop filter selectively inhibiting transmission, through the base optical substrate 110 towards the eye 50 of a user, of light in a selected range of wavelengths (target wavelength band), incident on the front surface 102 of the optical lens 100. The selective interferential filter 120 is configured to inhibit the transmission of light in the target wavelength band, at a given rejection rate, while having little or no effect on the transmission of incident light of wavelengths outside the selected range of wavelengths. In some embodiments the selective interferential filter 120 may be configured to inhibit, to a certain degree, transmission of incident light of wavelengths outside the target wavelength band, usually by absorption, but at a particular inhibition rate, which is less than the rejection rate of the wavelengths within the target band.

The eye 50 of a user is made up of a succession of dioptres di, and includes a pupil P, a center of rotation CRO and a retina. The features of the eye can be represented by models, such as the Liou & Brennan model, as illustrated in FIG. 1B.

Figure 1C:
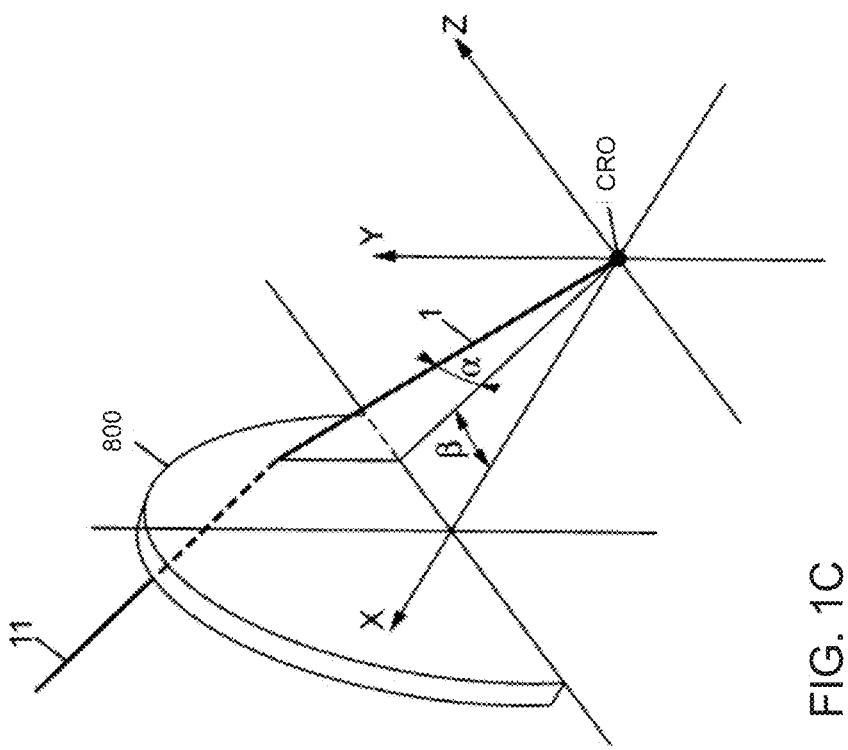

The potential lines of sight of a user are defined in more detail with reference to FIGS. 1C and 1D. Referring to FIG. 1C for a main line of sight 1 in central vision, light 11 passes through the center of rotation of the eye (CRO). The main line of sight 1 from the CRO to an optical substrate 800 is defined by an angle α defined with respect to a vertical plane and an angle β with respect to the XZ (horizontal plane). With reference to FIG. 1D for a line of sight 2 in peripheral vision, light 22 passes through the center of the pupil P of the eye. The line of sight 2 in peripheral vision from the pupil P to the optical substrate 800 is defined by an angle α' defined with respect to a vertical plane and an angle β' with respect to the X'Z' (horizontal plane).

FIG. 1E schematically illustrates the relationship between a line of sight 1 and an angle of incidence i of a central incident ray 11 on an optical substrate 800. The angle between the normal to the back surface (the surface proximal to a user) S2 of the optical substrate 800 and the line of sight 1 is referenced as r, and the angle between the normal to the front surface (the surface distal to a user) S1 of the optical substrate 800 and the incident ray 11 is referenced as i called the central angle of incidence. The relationship between the angles i and (α,β) depends on a number of parameters of the optical substrate such as the geometry of the lens including the thickness t of the optical substrate 800 and the center prism, as well as the surface equations defining the front S1 and back surfaces S2 of the optical substrate 800, and the refractive index n of the optical substrate. It depends also on the usage of the optical substrate, for example on the distance of the objects being viewed.

FIG. 1F schematically illustrates the relationship between a peripheral ray 2 and an angle of incidence i' of a peripheral incident ray 22 on an optical substrate 800. The angle between the normal to the back surface (the surface proximal to a user) S2 of the optical substrate 800 and the peripheral ray 2 is referenced as r', and the angle between the normal to the front surface (the surface distal to a user) S1 of the optical substrate 800 and the incident ray 22 is referenced as i' called the peripheral angle of incidence. The relationship between the angles i' and (α',β') depends on a number of parameters of the optical substrate such as the geometry of the lens including the thickness t of the optical substrate 800 and the center prism, as well as the surface equations defining the front S1 and back surfaces S2 of the optical substrate 800, and the refractive index n of the optical substrate. It depends also on the usage of the optical substrate, for example on the distance of the viewing objects.

It is well known that interferential filters present angular sensitivity. For a band-stop filter designed to reject a specific wavelength λ at normal incidence, increasing the incidence angles implies a spectral shift of the rejected wavelength towards lower wavelengths, an enlargement of the rejected band and a decrease of the rejection rate. In usual lighting conditions, a multitude of different incidence angles reaches an optical substrate (non collimated lighting conditions), for example when the optical substrate is illuminated by sunlight. By considering all the incident angles, the transmission spectrum of the filter is significantly modified: the bandwidth of the rejected band is significantly broadened and the filtering is no longer centered on the wavelength λ. For ophthalmic applications, this phenomenon of angular dependency can significantly increase the color distortion induced by the filtering and significantly introduce user's discomfort.

The selective interferential filter 120 is configured to better control and/or minimize the angular sensitivity.

To better control the spectral response of the band-stop filter, among the multitude of incidence angles that can impact the optical substrate for typical non-collimated light sources, such as sunlight, only those that reach the area of retina to be protected are determined and the filter is numerically designed by considering all those incidence angles instead of being designed by considering only one incidence angle, which is a limited collimated lighting condition. Those incidence angles form a cone of incidence angles that depends on several parameters such as the main line of sight, the size of the retina to be protected and the distance between the user and the optical substrate.

Figure 1G:
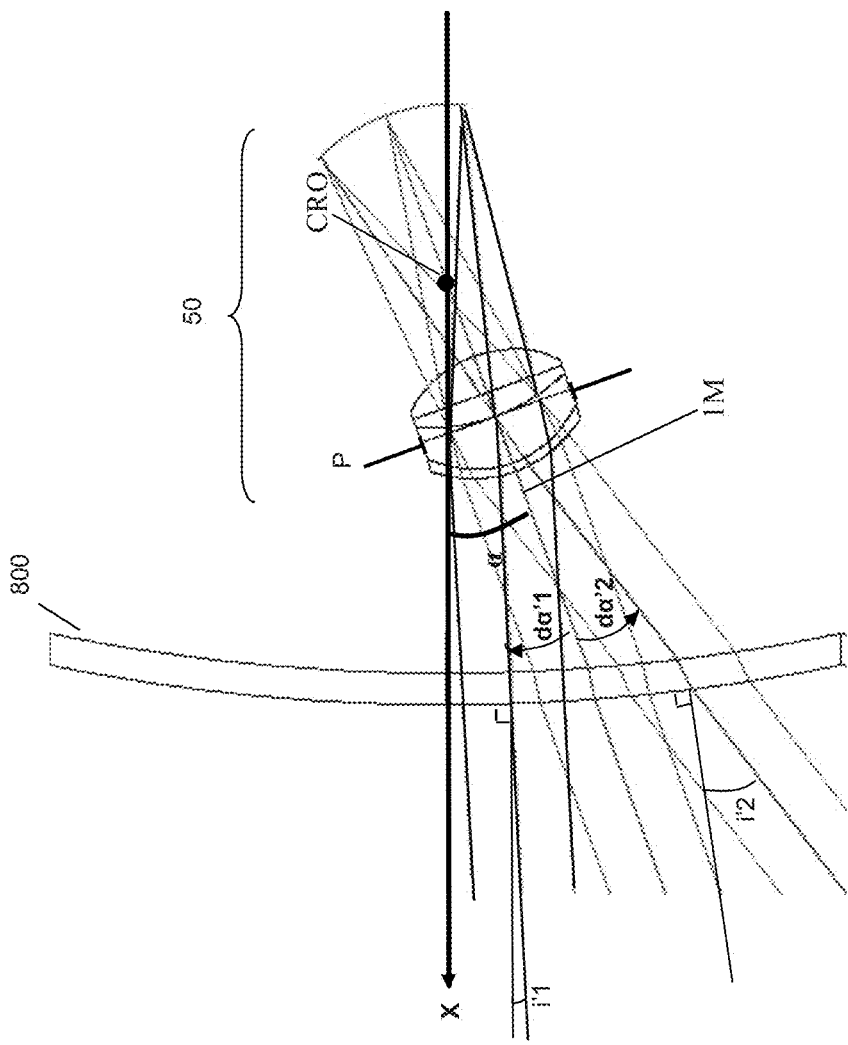

FIG. 1G schematically illustrates the determination of the cone of incidence angles associated with the main central line of sight 1M. The cone of incidence angles is defined by all the incidence angles between i'1 and i'2 which are the incidence angles of the peripheral rays of light that reach the borders of the area of the retina to be protected. It can also be defined by all the angles between (dα'1,dβ'1) and (dα'2, dβ'2), where (dα'n,dβ'n) (n=1, 2) correspond to the angles variation of the peripheral rays of light to the main line of sight 1M.

The optical lens further comprises a protective film 130 positioned over the selective interferential filter 120 to provide mechanical and environmental protection. The protective film 130 may also be provided with an anti reflective coating for preventing the reflection of incident light across the visible spectrum or within a selected wavelength band of the visible spectrum.

In general, interferential filters are based on Bragg gratings in which particular wavelengths of light are reflected and other wavelengths are transmitted. This is achieved by adding a periodic variation to the refractive index of a layered structure, which generates a wavelength specific dielectric mirror. The selective interferential filter 120 of embodiments of the invention may be configured to inhibit transmission of the incident light by reflection, refraction or diffraction. For example, the selective interferential filter 120 may be manufactured using interferential technologies, such as thin-film technology, holographic techniques, interference recordings, or photonic bandgap materials such as liquid crystal technology, including cholesteric crystals.

In one example, the selective interferential filter 120 may comprise a thin film device having a plurality of layers with different optical refractive indices. In general, thin-film technology uses multiple layers alternating two or more inorganic or hybrid materials with different refractive indices. Each layer may be provided as a coating deposited on the front surface 112 of the base optical substrate 110 by techniques such as sputtering, vacuum evaporation or physical or chemical vapour deposition. Such technology is used for anti-reflective layers on goggles, spectacles or eyeglasses and transparent optical surfaces.

An inorganic and organic hybrid stack of layers may be used to optimise the mechanical robustness and curvature compatibility. The layers may be deposited on a polymeric film of PET (polyethylene terephthalate), TAC (cellulose triacetate), COC (cyclic olefin copolymer), PU (polyurethane), or PC (polycarbonate), and then disposed on an outer side of the front surface 112, for example by a transfer operation onto the outer side of the front surface 112.

A transfer operation includes a coating or film initially disposed on a first support being transferred from the first support cohesively onto another support; or the transfer of a self supporting coating or film directly to a support. In the present example the support is the optical substrate.

The binding between the coating or film and the outer surface of the optical substrate may be obtained either by means of activation of the surface of the coating or film and/or a medium capable of creating physical or chemical interactions, or by means of an adhesive (glue).

In one particular embodiment of the invention, the selective interferential filter thin film technology may be adapted so that many layers are used, for example 20 layers.

In a further embodiment, the selective interferential filter 120 may comprise a Rugate filter device having a variable optical refractive index, which varies sinusoidally with depth. A rugate filter enables bouncing of the reflection function outside the selected inhibition band to be minimised.

The Rugate filter may be applied as a coating to the front surface 112 in a similar manner to thin film technology as described above.

In another embodiment, the selective interferential filter 120 may comprise a holographic device comprising a holographic recording. Examples of holographic recording are given in the document "Holographic Imaging" by Stephen A. Benton and V. Michael Bove, Wiley-Interscience, 2008. The recording of holographic band-stop rejection filters is typically made by forming into a photo-sensitive material the interference of two coherent laser beams, appropriately shaped, each one propagating in a chosen direction. Controlling the optics of the set-up, such as the vergence, the shape, and the relative intensity of each beam, is used to manage the recording step. The exposure and of the processing of the photo-sensitive material is monitored in order to obtain the performances needed to define the target band of wavelengths to be inhibited and to ensure the centering of the band over a given wavelength.

Such holographic recordings can be made within a photosensitive material, typically but not exclusively a photopolymer. The photosensitive material is coated on a flat or on a curved surface, or casted between two curved surfaces, one of which may be removed after the recording stage; the hologram can be inscribed within the volume of a curved thick photosensitive material, for example, a photorefractive glass previously shaped as an optical lens such as an ophthalmic lens, which, after recording and fixing presents a very small index modulation according to the interference designed by the optical setup, such that the periodic index modulation generates the target band-stop filter device.

Another embodiment involves recording a predistorted rejection filter, such as a predistorted hologram on a photosensitive material deposited on a flat film of PET, TAC, COC, PU, or PC and later disposing it, for example by a transfer operation, on a curved substrate, for example a curved surface of an ophthalmic lens.

Holograms disposed on a curved surface, for example by a transfer operation or other suitable means, may then be covered by another curved surface, or laminated to it, in such a manner as to be sandwiched between two mechanically stabled curved substrates.

An example of a process for the fabrication of a holographic device by making a reflexion hologram is disclosed in U.S. Pat. No. 4,942,102. An example of tuning of a holographic grating is disclosed in U.S. Pat. No. 5,024,909. A variant for continuously recording a holographic element of large size is for example disclosed in EP 0 316 207 B1.

In another embodiment the selective interferential filter may comprise a photonic bandgap material, such as for example chlolesteric liquid crystal. Use of chlolestric crystals enable an electrically controllable filter to be devised. In order to obtain a reflection of >50% two layers may be used. The chlolesteric liquid crystals may be provided in the form of at least one sealed layer of liquid or gel on the first surface of the optical substrate.

Photonic Crystals are periodical arrangements of metallic or dielectric objects layers that can possess a range of forbidden wavelengths, the so-called photonic bandgap (PBG), analogous to electronic bandgaps in semiconductor materials. The geometry of the periodic pattern and the material properties of the substrate determine the photonic band structure, i.e. the dispersion.

Photonic Crystals can be built in one, two or three dimensions. 1D-Photonic Crystals, like the standard Bragg reflector, can be fabricated by successively depositing layers of different dielectric constant. Manufacturing of a 1D-periodic structure may be achieved by coating on a film of PET, TAC, COC, PU, or PC alternate layers of different bulk refractive indices, such layers being made either of homogeneous material or being constituted by arrangement of identical geometrical structures, e.g. arrays of identical spheres monodispersed in size or by periodic organization of a PDLC (polymer-dispersed liquid crystal) polymer, and then disposed on a curved surface of an optical lens, for example by a transfer operation. Such 1D-periodic structure coated on a film of PET, TAC, COC, PU, or PC can be activated either mechanically, thermally, electrically, or even chemically to induce a controlled modification of the filtering band and/or of the central filtering wavelength, such as described in Nature Photonics Vol. 1 No. 8—August: P-Ink Technology: Photonic Crystal Full-Colour Display, by André C. Arsenault, Daniel P. Puzzo, Ian Manners & Geoffrey A. Ozin For 2D-Photonic Crystals, reactive ion etching (J. O'brien, et al., Lasers incorporating 2D photonic bandgap mirrors, Electronics Letter, 32, 2243 (1996); Mei Zhou, Xiaoshuang Chen, Yong Zeng, Jing Xu, Wei Lu, Fabrication of two-dimensional infrared photonic crystals by deep reactive ion etching on Si wafers and their optical properties, Solid State Communications 132, 503 (2004)) or aluminium oxide films (H. Masuda, et al., Photonic band gap in anodic porous alumina with extremely high aspect ratio formed in phosphoric acid solution, Japanese Journal of Applied Physics, 39, L1039 (2000)) are common manufacturing approaches. 2D PBG also can be fabricated by interference recording (so-called "holographic" recording, sometimes followed by reactive ion etching. 3D-Photonic Crystals can be classically manufactured layer by layer (S. Y Lin, et al., A three dimensional photonic crystal operating at infrared wavelengths, Nature 394, 251 (1998)). This technique has the advantage of allowing an excellent control of structure optical bandgap. They can also be fabricated by alternative techniques, including X-ray Lithography (LIGA), Holographic Lithography—the interference of four non-coplanar laser beams in a light-sensitive polymer generates a three-dimensional periodic structure; two-photon polymerization (TPP), using two-photon absorption with a pulsed laser to stimulate photo polymerization; Three-dimensional micro fabrication with two-photon-absorbed photo polymerization. Another technique for producing Photonic Crystals uses the self-assembly of colloidal polymer microspheres into colloidal crystals. For example, colloidal suspensions of opal glass spheres are disclosed in (S. John, Photonic Bandgap Materials, C. Sokoulis, Ed. Dordrecht: Kulwer Academic Publishers (1996)). Bragg diffraction of light within colloidal crystals gives rise to a stop-band filter. Another technique consists in inversing an opal, e.g. by removing (dissolving) the latex spheres in an artificial opal and leaving the surrounding structure. Inversed opals were among the very first 3D PBG made (citation: Voss, in the Netherland)

Photonic Crystal periodic structures can be either coated on a film of PET, TAC, COC, PU, or PC and combinations thereof, or made active, in particular electrically active, in the case of the organization of Holographic-Polymer Dispersed Liquid Crystals, Passive or active devices are then disposed on a curved surface of an optical lens, for example by a transfer operation.

In one particular embodiment the selective interferential filter 120 may be configured as an interference grating device, arranged such that the selected range of angles of incidence is centered on an angle of incidence substantially normal to the interference patterns of the interference grating.

Using the different types of interferential filter technology described above, inhibition of the transmission of a target wavelength band can be achieved according to the requirements of the user.

In the case, for example of a selective interferential filter 120, for inhibiting the transmission of phototoxic light in the first selected range of wavelengths, the selective interferential filter 120, based on one or more of the above-described technologies, may be configured to inhibit transmission of light incident on the front surface of the optical device 100 of wavelengths in a bandwidth in a range of from 10 nm to 70 nm, preferably 10 nm to 60 nm centered on a wavelength within a range of between 430 nm and 465 nm while enabling transmission of incident light outside the target wavelength band. Since this target range of wavelengths corresponds to the range of wavelengths of toxic light (as described in what follows and shown in FIGS. 14 and 15), protection of the retina against such light may be achieved.

Moreover, the selective interferential filter may be configured to transmission specific wavelengths of light toxic to certain eye disorders or disease.

For example, glaucoma is an eye disorder in which the optic nerve suffers damage, permanently impacting vision in the affected eye(s) and progressing to complete blindness if untreated. Moreover, the nerve damage involves loss of retinal ganglion cells in a characteristic pattern. Worldwide, it is the second leading cause of blindness. Glaucoma is often, but not always, associated with increased pressure of the fluid in the anterior segment of the eye (aqueous humour).

Various studies have previously been carried out on the possible causes of glaucoma. However, even if there is increasing evidence that ocular blood flow is involved in the pathogenesis of glaucoma, and a possible correlation between hypertension and the development of glaucoma has been shown, experiments are still carried out. Intraocular pressure is only one of the major risk factors for glaucoma, however lowering it with various pharmaceuticals and/or surgical techniques is currently the main stay of glaucoma treatment. For the time being, glaucoma management requires appropriate diagnostic techniques and follow-up examination, as well as judicious selection of treatments for the individual patient. In particular, intraocular pressure can be lowered with medication, usually eye drops. However, the treatment does not always halt the degenerative process even if the intraocular pressure is reduced to normal. Both laser surgery and conventional surgery are performed to treat glaucoma. Surgeries are the primary therapy for those with congenital glaucoma.

Retinopathy is a general term that refers to some forms of non-inflammatory damage to the retina of the eye. Frequently, retinopathy is an ocular manifestation of systemic disease. Diabetic retinopathy is caused by complications of diabetes mellitus, which can eventually lead to blindness. It is an ocular manifestation of a systemic disease which affects up to 80% of all patients who have had diabetes for ten years or more. Diabetic retinopathy is associated with microvascular retinal changes. It has been recently found that ganglion retinal cells degenerate during diabetic retinopathy (http://onlinelibrary.wiley.com/doi/10.1113/jphysiol.2008.156695/full; and Kern T. S. and Barber A. J. Retinal Ganglion Cells in Diabetes. The Journal of Physiology 2008. Wiley online library).

Retinal ganglion cell death has been observed in some other pathologies in which the mitochondrial function is disrupted such as Leber's hereditary optic neuropathy.

Innovative studies were performed by the inventors on the influence of light in retinal ganglion cells (RGC) dysfunction and their associated pathologies such as glaucoma, diabetic retinopathy and Leber's optic neuropathy, The phototoxicity on RGC was performed using a primary cell model of glaucoma. Studies have shown that purified adult rat retinal ganglion cells is a suitable in vitro model of glaucoma (Fuchs C et al, IOVS, Retinal-cell-conditioned medium prevents TNF-alpha-induced apoptosis of purified ganglion cells. 2005). Therefore, to determine if light-induced cell death can contribute to the degeneration of such cells in glaucoma, diabetic retinopathy and Leber's hereditary optic neuropathy, primary cultures of adult rat retinal ganglion cells were exposed to light for 15 hours in black-clear bottom 96 wells culture dishes. Light expositions were selected from 385 to 525 nm in 10 nm increments and designated by the central wavelength as illustrated in FIG. 13. To prevent any light filtering effect of the medium, cells were cultured in an NBA medium without aromatic amino acids, Phenol red or serum and other photosensitive molecules in the visible spectrum. Light irradiances were normalized with respect to the natural sun light (Solar spectra of reference ASTM G173-03) reaching the retina after filtering by the eye optic, cornea, lens and vitreous humour (E. A. Boettner, Spectral transmission of the eye, ClearingHouse, 1967). For these neuronal cells, cell viability was assessed with the highly sensitive viability assay CellTiter-Glo (Promega, Madison, Wis., USA). FIG. 14 illustrates the RGC survival for all tested light exposures thereby indicating the corresponding cell loss with respect to the control condition. The experimental data indicated that the loss of retinal ganglion cells was induced with all the 10 nm bandwidths from 420 to 510 nm showing the greatest effects with bandwidths centered at 450, 460 nm and 470 nm.

Thus in one particular embodiment, the target band may have a bandwidth of 10 nm to 70 nm, preferably, 15-25 nm centered on a wavelength of around 460 nm. Such a target band has been shown by the RGC cellular model studies performed by the inventors as described above to be particularly toxic for sufferers of Glaucoma, diabetic retinopathy or Leber's hereditary optic neuropathy. Consequently, preventing transmission of wavelengths in this target band to the eye of a user provides protection and slows down progress of these particular diseases.

Innovative studies were also performed by the inventors on the influence of light in retinal pigment epithelium (RPE) and the associated pathologies such as Age Related Macular degeneration (AMD), Stargardt disease, retinitis pigmentosa or Best's disease.

RPE of patients affected by AMD were found to contain increased concentrations of A2E (C A. Parish et al., Isolation and one-step preparation of A2E and iso-A2E, fluorophores from human retinal pigment epithelium, IOVS, 1998). Therefore, to generate a model of AMD, retinal pigment epithelium cells isolated from swine eyes were incubated in the presence of A2E (40 µM) for 6 hours to trigger its cell absorption. After a medium change, these primary cell cultures of RPE cells were exposed to light with 10 nm bandwidth in black-clear bottom 96 wells culture dishes for 18 hours. Light expositions were selected from 385 to 525 nm in 10 nm increments and designated by the central wavelength as illustrated in FIG. 13 (e.g. 390 nm for the bandwidth from 385 to 395 nm). To prevent any light filtering and/or photosensitization of the culture medium, cells were cultured in a DMEM medium without aromatic amino acids, Phenol red or serum and other photosensitive molecules. Light irradiances were normalized with respect to the natural sun light (Solar spectrum of reference ASTM G173-03) reaching the retina after filtering by the eye optics (cornea, lens; E. A. Boettner, Spectral transmission of the eye, ClearingHouse, 1967). RPE cell apoptosis was quantified 6 h hours after illumination. FIG. 15A illustrates the absence of light-induced apoptosis in the absence of A2E incubation as measured with the Apotox-Glo by caspase-3 activation reported to cell viability (Promega, Madison, Wis., USA). By contrast, FIG. 15B shows that when A2E was preincubated with RPE cells, the RPE apoptosis was induced significantly with the 10 nm bandwidths centered at 420, 430, 440 and 450 nm (from 415 to 455 nm).

Thus, in another example, the target band may have a bandwidth of 10-70 nm, preferably 15-25 nm centered on a wavelength of around 435 nm. Such a target band has been shown by the innovative studies described above particularly toxic for sufferers of AMD, Stargardt disease, retinitis pigmentosa or Best's disease and so preventing transmission of wavelengths in this target band to the eye of a user provides protection and slows down progress of the disease.

In another example, the target band may have a bandwidth of 10-70 nm, preferably 30-60 nm centered on a wavelength of around 445 nm. Such a target band includes the wavelengths which have been shown by the innovative studies on the RGC cellular models described above to be particularly toxic for sufferers of Glaucoma, diabetic retinopathy or Leber's optic neuropathy, as well as the wavelengths which have been shown by the RPE cellular model studies to be particularly toxic for sufferers of AMD, Stargardt disease, retinitis pigmentosa or Best's disease and so prevents transmission of wavelengths in this target band to the eye of a user provides protection and slows down progress of any, or several, of these diseases.

In the case, for example, of preventing melatonin suppression, the selective interferential filter 120, based on one or more of the above-described technologies, may be configured to inhibit the transmission of wavelengths of light in a target band of 465 nm to 495 nm centered on a wavelength of 480 nm for example. Light having wavelengths in this wavelength band suppresses the production of Melatonin. Melatonin (N-acetyl-5-methoxytryptamine) is the principal hormone of the pineal gland, and controls many biological functions, particularly the timing of those physiological functions that are controlled by the duration of light and darkness. Thus optical devices having selective filtering means configured to inhibit transmission of light in this target wavelength band may be used to prevent melatonin suppression, particularly at night.

In the case, for example of compensating and restoring contrast in the red-green axis for improved colour vision, the selective interferential filter 120 may be configured to inhibit the transmission of wavelengths of light in a target wavelength band of 550 nm to 660 nm, for example.

In the case, for example of treatment or prevention of migraines, the selective interferential filter 120 may be configured to inhibit the transmission of wavelengths of light in a target wavelength band of 590 nm to 650 nm, for example, and preferably 615-625 nm.

In the case, for example of treatment of epilepsy or prevention of epileptic attacks, the selective interferential filter 120 may be configured to inhibit the transmission of wavelengths of light in a target wavelength band of 560 to 600 nm.

In a particular embodiment, the selective interferential filter 120 may be configured to inhibit the transmission of wavelengths in two target wavelength bands. Specific configuration of the selective interferential filter to provide narrow bandwidths enables dual band selective interferential filters to be used. Dual band interferential filtering may be provided by using two different interferential filters inhibiting transmission in different target wavelength bands or by a single interferential filter configured to inhibit transmission in two different target bands of wavelengths.

An embodiment for providing a dual band filter may involve recording, simultaneously or consecutively, two holograms on the same photosensitive material in order to produce two different target wavelength filtering bands, each target wavelength band may be characterised by its own bandwidth, central wavelength, and own rejection factor In another embodiment, two different holograms, each one coated on a film of PET, TAC, COC, PU, or PC or on glass, and recorded either on the same kind of photosensitive material or on two different photosensitive materials are stacked on top of each other, either together with their substrate or after having been lifted off their substrate, in particular to be deposited or thermoformed on a curved substrate.

In one of the possible implementations, a mixture of two technologies may be used to produce a dual band filter, e.g. a hologram may be superimposed over an absorptive filter made of a layer containing a pigment or a dye, for example a pigment or dye of embodiments which will be described later in the present application.

In another embodiment, the mixture of two technologies is composed of the superposition of two selective filters generated with two different absorbing layers, each one containing its proper pigment or dye, independently of the order of the two layers.

In another embodiment, a hologram is stacked with a 1D or a 2D photonic crystal, or with a stack of thin films, independently of the substrate over which those have been prepared or lifted off, and independently of the order of the superposition.

In another embodiment, a thin film stack is superposed on a photonic crystal, independently of the order of the superposition not being important, and the optically transparent substrate over which the two selective filters have been deposited.

In this way two or more target wavelengths in which transmission of incident light is inhibited may be obtained. For example, a first target wavelength band may have a bandwidth of 10-30 nm, preferably 15-25 nm centered on a wavelength of around 435 nm and a second target wavelength band may have a bandwidth of 10-30 nm, preferably 15-25 nm centered on a wavelength of 460 nm. As in the previous example, the target wavelength band includes the wavelengths which have been shown by the RGC cellular model studies performed by the inventors to be particularly toxic for sufferers of Glaucoma, diabetic retinopathy, or Leber's hereditary optic neuropathy as well as the wavelengths which have been shown by the RPE cellular model studies to be particularly toxic for sufferers of AMD, Stargardt disease, retinitis pigmentosa or Best's disease. However, the interferential filter 120 in this particular example is more selective and enables increased transmission of light between the two target bands thereby having a reduced effect of visual colour distortion and improved scotopic vision.

The rate of rejection in the one or more target wavelength bands may be adjusted by configuring the selective interferential filter 120 using the appropriate different technology described above according to the users needs. For example, for a general protection usage, the rejection rate within the single target wavelength band or dual target wavelength bands, may be configured to be 30 to 50% in order to limit the distortion of colour perception, perturbation of scotopic vision and disturbance of non-visual functions of the eye. For slowing down the progress of diseases such as AMD, Stargardt disease, retinitis pigmentosa, Best's disease, glaucoma, diabetic retinopathy or Leber's hereditary optic neuropathy, the rejection rate may be increased to about 80-100% in order to provide reinforced protection for a diseased eye. For a usage requiring solar protection, for example, transmission across the entire visible spectrum is inhibited at an inhibition rate in a range of from 40% to 92%, and the first rate of rejection may be configured to provide at least 5% additional inhibition for the first selected range of wavelengths.

An optical device according to a second embodiment of the invention will be described with reference to FIG. 2. FIG. 2 is a schematic diagram of an optical lens 200 comprising a base optical substrate 210 having a first surface 211 and a second surface 212 similar to the base optical substrate of the first embodiment. The optical lens 200 further comprises a selective interferential filter 220 provided, at the front surface 212 of the base optical substrate 210. The selective interferential filter 220 operates in the same way as the selective interferential filter 120 of the first embodiment. The second embodiment differs to the first embodiment in that the back surface 211 of the optical substrate is provided with a layer of absorption material 222, configured to absorb a part of the light in the target bandwidth of the selective interferential filter 220. First, it significantly reduces the parasitic light that reaches the user's eye, coming from light incident on the back surface 201 of the optical device and reflected by the selective interferential filter 220. Indeed, the presence of the selective interferential filter 220 introduces the reflection of parasitic light back towards the eye of the user and thus the presence of the layer of absorption material 222 helps to decrease the undesirable reflection effects. Next, the absorption material 222 enhances the spectral filtering introduced by the selective interferential filter 220 since some light in the target wavelength which was not rejected by the selective interferential filter 220 may then be attenuated by the layer of absorption material 222.

In other embodiments the layer of absorption material 222 is configured to absorb light in a different target wavelength band to the target wavelength band of the selective interferential filter 220, which helps to provide a colour balancing effect. For example, some absorption in the region of the orange-red part of the visible spectrum helps to attenuate the distortion of colour perception induced by the selective interferential filter 220. In further embodiments, the use of a layer of absorption material 222, which operates to absorb light in a different target wavelength band to the target wavelength band of the selective interferential filter 220 as well as in the same target wavelength band may be used to provide a colour balancing effect as well as an enhanced filtering effect.

In some embodiments a layer of non-selective absorption material which operates to absorb light in the full range of the visible spectrum may be used.

The absorption material may be an absorptive dye or pigment such as will be described for later embodiments of the present invention.

While in this embodiment the absorptive layer is provided on the back surface of the optical substrate, it will be appreciated that in other embodiments of the invention, the absorptive layer may be provided as a layer within the optical substrate, between the selective interferential filter and the back surface of the optical substrate.

Figure 3:
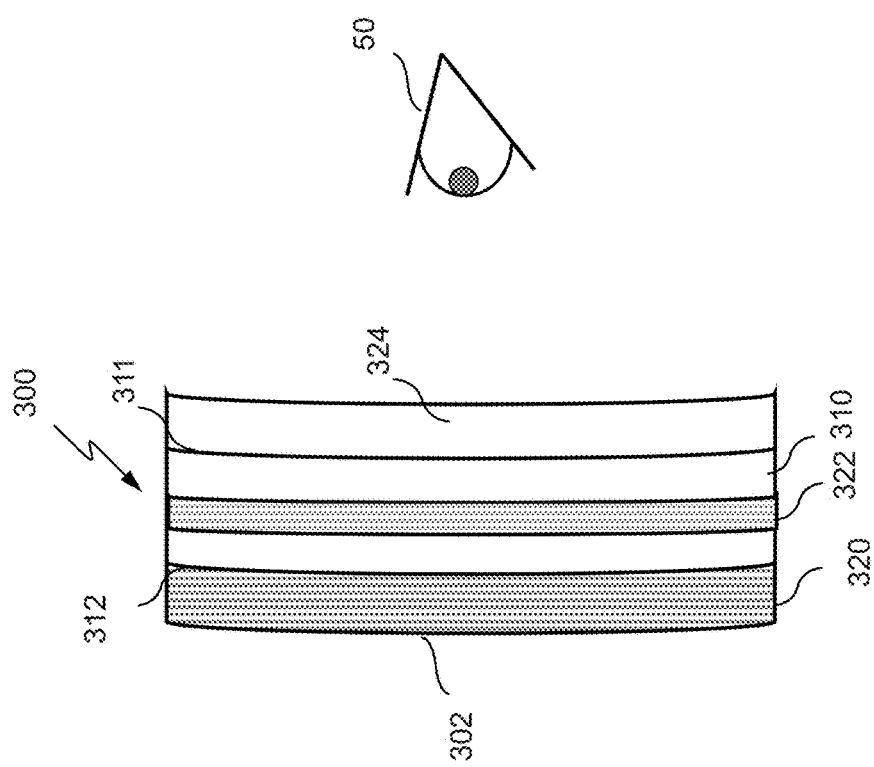
FIG. 3 is a schematic diagram of an optical device comprising an optical substrate in accordance with a third embodiment of the invention.

An optical device according to a third embodiment of the invention will be described with reference to FIG. 3. FIG. 3 is a schematic diagram of an optical lens 300 comprising a base optical substrate 310 having a first surface 311 and a second surface 312 similar to the base optical substrate of the first embodiment. The optical lens 300 further comprises a first selective interferential filter 320 provided on the front surface 312 of the base optical substrate 310 and a second selective interferential filter 322 provided as a layer within the volume of the base optical substrate 310. The selective interferential filters 320 and 322 operate in the same way as the selective interferential filter 120 of the first embodiment. Both the first selective interferential filter 320 and the second interferential filter 322 may be configured to inhibit transmission in the same target wavelength band. The advantage provided by this embodiment is that the second interferential filter 322 may provide enhanced protection in the target wavelength band by enabling an overall increase in rejection factor in the target wavelength band to be obtained. This enhanced protection may be adapted to the needs of the user, thereby providing design flexibility—e.g. depending on whether or not the user suffers from a disease such as for example AMD, Stargardt disease, retinitis pigmentosa, Best's disease, glaucoma, diabetic retinopathy or Leber's hereditary optic neuropathy, or to what degree the user suffers from that disease. For example a first selective interferential filter 322 within the optical substrate may provide a level of protection for normal usage while the addition of a second selective interferential filter 320 to the front surface of the optical substrate may increase that level of protection to a therapeutic level suitable for preventing progress of disease in a subject susceptible to or suffering from any of the aforementioned diseases.

The back surface 311 of the optical substrate may be provided with a layer of absorption material 324, similar to the layer of absorptive material of the second embodiment, configured to absorb light in the target bandwidth of the selective interferential filter 322 and/or the selective interferential filter 320. The provision of absorption material 324 in this way significantly reduces the parasitic light that reaches the user's eye, coming from light incident on the back surface 311 of the optical device and reflected by the selective interferential filter 322 and/or the selective interferential filter 320. Moreover, the absorption material 324 enhances the spectral filtering introduced by the selective interferential filter 322 and/or the selective interferential filter 320.

Like the layer of absorptive material of the previous embodiment, the absorptive layer 324 may also be configured to absorb light in a wavelength band different to the target bandwidth of the selective interferential filter 322 and/or the selective interferential filter 320 for colour balancing, or in the full range of the visible spectrum, or in the target bandwidth of the selective interferential filter 322 and/or the selective interferential filter 320 for enhanced protection and a different wavelength band for colour balancing.

In further embodiments, one of the selective interferential filters may be added to the front surface of the optical substrate to provide protection in a different target wavelength band to the target wavelength band of a selective interferential filter provided within the optical substrate, or on the front surface, of the optical substrate. By adding protection within a different wavelength band additional usages or protections may be envisaged. For example, in one embodiment colour balancing may be provided. In another embodiment, protection in a target wavelength band relative to light detrimental to glaucoma, diabetic retinopathy or Leber's optic neuropathy may be provided by one selective interferential filter and additional protection in a further target band relative to light detrimental to AMD, Stargardt disease, retinitis pigmentosa or Best's disease, may be provided by another selective interferential filter. Alternatively one selective interferential filter may be configured to protect against a range of wavelengths in one part of the electromagnetic spectrum while the other selective filter may be configured to protect against a range of wavelengths of another part of the electromagnetic spectrum.

An optical device according to a fourth embodiment of the invention will be described with reference to FIG. 4. FIG. 4 is a schematic diagram of an optical lens 400 comprising a base optical substrate 410 having a first surface 411 and a second surface 412. In the specific embodiment of an optical lens the first surface 411 is a concave back/posterior surface, disposed proximal to an eye 50 of a user in use and the second surface 412 is a convex front/anterior surface disposed in use distal to the eye 50 of the user. The optical lens further comprises an absorptive filter 420 provided, in this embodiment, within the volume of the base optical substrate 410. The absorptive filter 420 in this embodiment is provided as a film containing a dye or pigment and interposed between two layers of the base optical substrate 410. In other embodiments of the invention the absorptive layer may be provided on either surface of the optical substrate.

The absorptive filter 420 operates as a band stop filter selectively inhibiting transmission, through the base optical substrate 410 from the front surface 412 towards the eye 50 of a user, of light in a selected range of wavelengths, referred to as a target wavelength band, incident on the front surface of the 412 optical lens 100 while having little or no effect on the transmission of incident light of wavelengths outside the selected range of wavelengths, unless specifically configured to do so. The absorptive filter 420 is configured to inhibit the transmission of the selected range of wavelengths at a given inhibition rate. In some embodiments the optical device further comprises a protective film (not shown) positioned over the base optical substrate 410 to provide mechanical and environmental protection. The protective film may also be provided with an anti reflective coating for preventing the reflection of incident light in across the visible spectrum or within a selected band of the visible spectrum corresponding, or not, to the target wavelength band of the absorptive filter 420.

The absorptive filter 420 may in one example of the invention comprise a dye or pigment such as Auramine O; Coumarin 343; Coumarin 314; Proflavin; Nitrobenzoxadiazole; Lucifer yellow CH; 9,10 Bis(phenylethynyl)anthracene; Chlorophyll a; Chlorophyll b; 4-(Dicyanomethylene)-2-methyl-6-(4-dimethylaminostyryl)-4H-pyran; and 2-[4-(Dimethylamino)styryl]-1-methypyridinium iodide, Lutein, Zeaxanthin beta-carotene or lycopen; or any combination thereof. Lutein (also known as Xanthophyll) and Zeaxanthin, for example, are natural protectors which accumulate in the retina their concentration decreasing with age. Providing an absorptive filter containing such substance helps to compensate for the natural loss of the substances in the eye.

The choice of pigment or dye will depend on the target wavelength band or bands of the absorptive filter 420.

Figure 10:
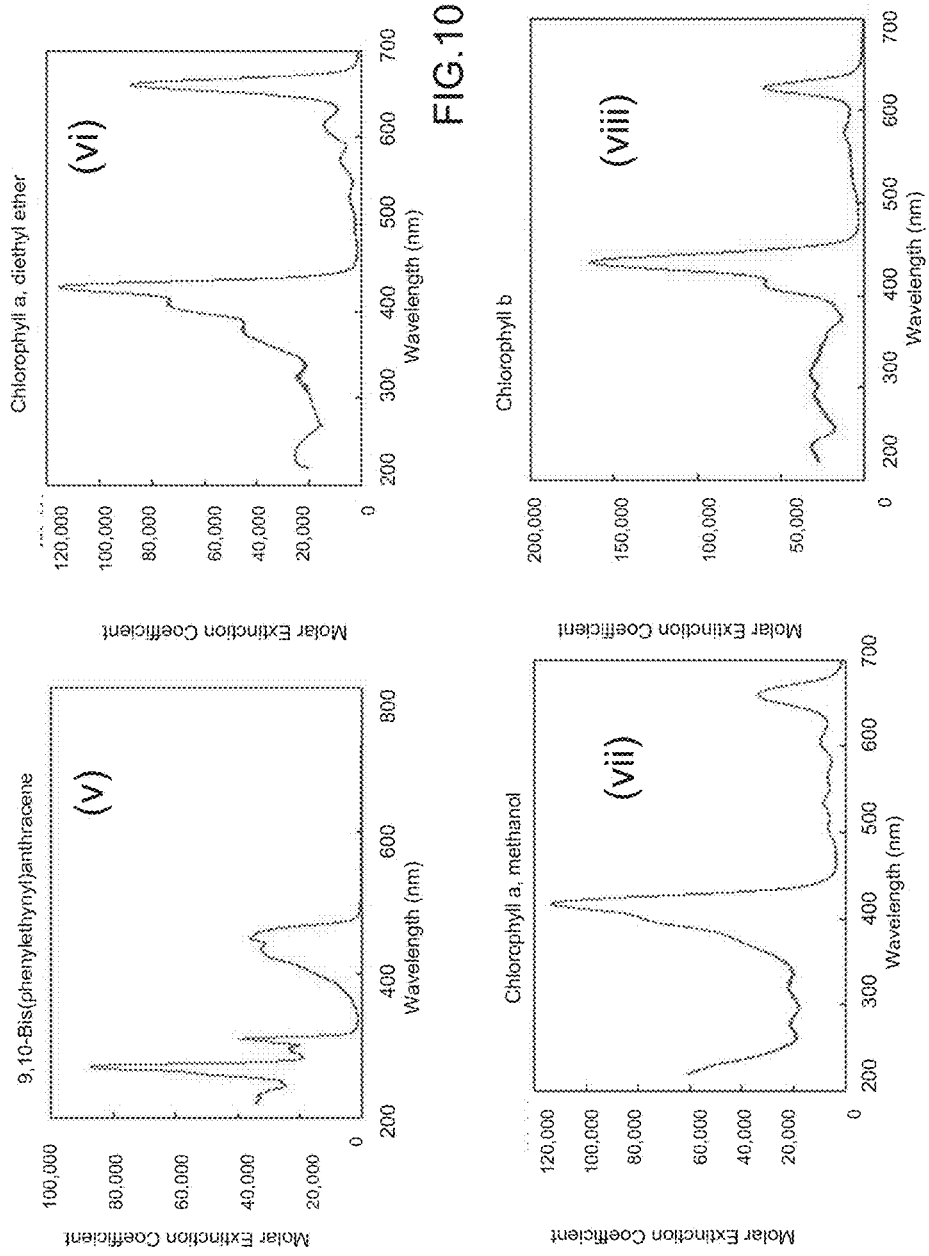

For example, for protection against phototoxic light, a number dyes or pigments provide a high level of absorption in the wavelength band of 420 nm to 470 nm as illustrated in FIG. 10. FIGS. 10(i) to 10(viii) illustrate the absorption spectrums of the following substances respectively (i) Auramine O dissolved in water exhibits an absorption peak at around 431 nm with a bandwidth (measured as FWHM) of 59 nm; (ii) Coumarin 343; dissolved in ethanol exhibits an absorption peak at around 445 nm with a bandwidth (measured as FWHM) of 81 nm; (iii) Nitrobenzoxadiazole dissolved in ethanol; exhibits an absorption peak at around 461 nm with a bandwidth (measured as FWHM) of 70 nm; (iv) Lucifer yellow CH dissolved in water exhibits an absorption peak at around 426 nm with a bandwidth (measured as FWHM) of 74 nm; (v) 9,10 Bis(phenylethynyl) anthracene dissolved in Cyclohexame exhibits an absorption peak at around 451 nm with a bandwidth (measured as FWHM) of 67 nm; (vi) Chlorophyll a dissolved in diethyl ether exhibits an absorption peak at around 428 nm with a bandwidth (measured as FWHM) of 44 nm; (vii) Chlorophyll a dissolved in methanol exhibits an absorption peak at around 418 nm with a bandwidth (measured as FWHM) of 42 nm; (viii) Chlorophyll b dissolved in diethyl ether exhibits an absorption peak at around 436 nm with a bandwidth (measured as FWHM) of 25 nm.

As can be seen from the respective absorption spectrums, these substances provide spectrums having absorption in a narrow bandwidth of FWHM of 10 to 82 nm thereby providing selective filtering means leading to a reduction in undesirable visual distortion.

In other embodiments the absorptive filter 420 may contain a porphyrins or a derivative thereof.

Some examples of porphyrins include 5,10,15,20-Tetrakis (4-sulfonatophenyl) porphyrin sodium salt complex; 5,10, 15,20-Tetrakis(N-alkyl-4-pyridyl) porphyrin complex; 5,10, 15,20-Tetrakis(N-alkyl-3-pyridyl) porphyrin metal complex, and 5,10,15,20-Tetrakis(N-alkyl-2-pyridyl) porphyrin complex, or any combination thereof. The alkyl may be methyl, ethyl, butyl and/or propyl. All these porphyrins show very good water solubility and are stable up to 300° C.

The complex can be a metal complex wherein the metal may be as Cr(III), Ag(II), In(III), Mg(II), Mn(III), Sn(IV), Fe (III), or Zn(II). Such metal complexes exhibit an absorption in water of between 425 and 448 nm which corresponds to a range of wavelengths exhibiting phototoxicity. Metal complexes based on Cr(III), Ag(II), In(III), Mn(III), Sn(IV), Fe (III), or Zn(II) in particular have the advantage that they are not acid sensitive and provide more stable complexes since they will not loose the metal at pH<6. Moreover these porphyrins do not exhibit fluorescence at room temperature. Such properties are of interest for use in optical lens such as ophthalmic lenses, contact lenses and IOLs, for example. The porphyrin can be selected according to the target wavelength band or target wavelength bands where the transmission of the light is to be inhibited. The absorption band of wavelengths depends upon the solvent and pH. The bandwidth will depend on the solvent, pH and on the concentration since dyes tend to aggregate at higher concentrations leading to broader peaks. The target band can thus be obtained by the choice of porphyrin, the pH and the solvent, as well as the concentration.

Figure 11:
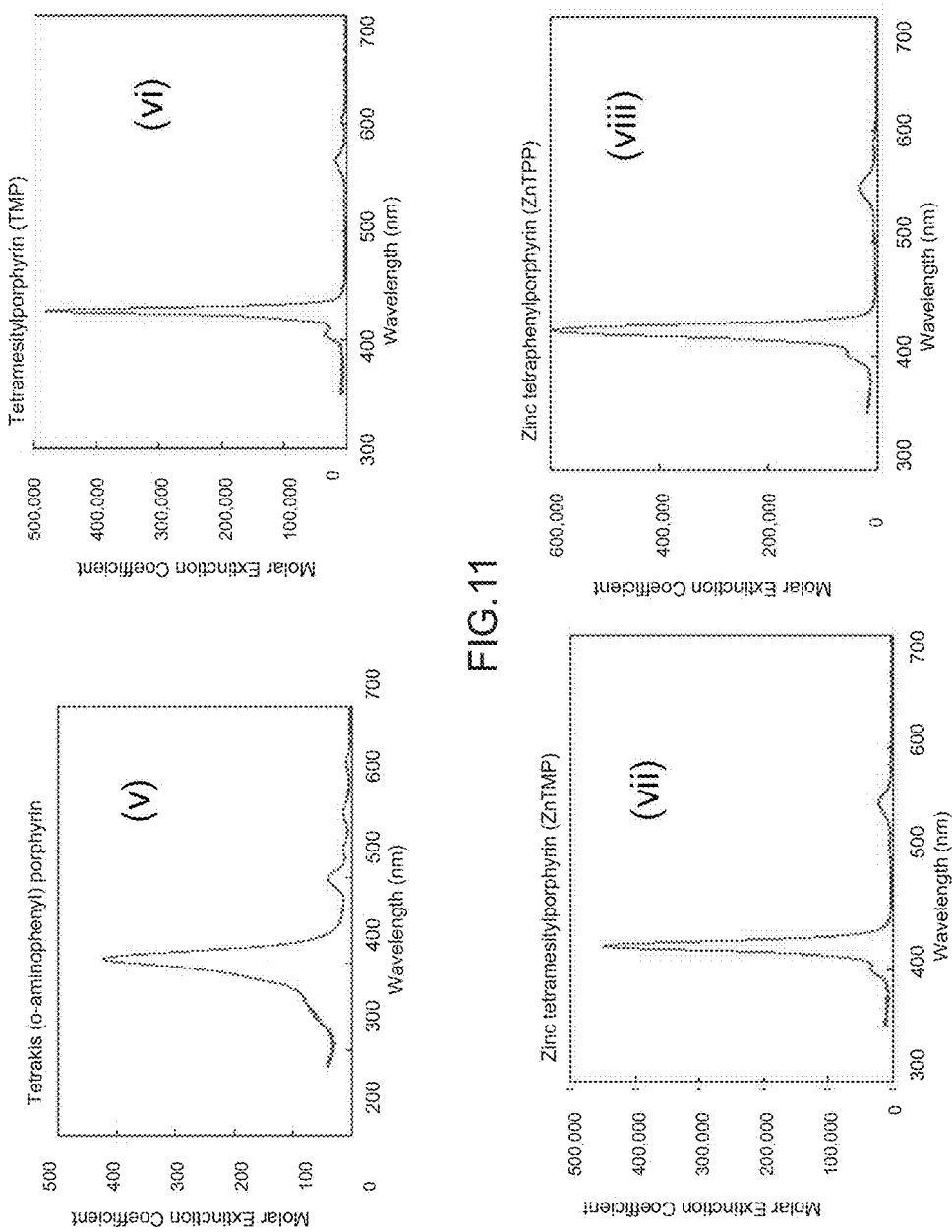

FIGS. 11(i) to 11(viii) illustrate the absorption spectrums of the following porphyrins respectively (i) Diprotonated-tetraphenylporphyrin dissolved in chloroform and HCl having an absorption peak at approximately 445 nm with a bandwidth (measured as FWHM) of 18 nm; (ii) Magnesium Octaethylporphyrin dissolved in toluene having an absorption peak of 410 nm with a bandwidth (measured as FWHM) of 14 nm; (iii) Magnesium Tetramesitylporphyrin dissolved in toluene having an absorption peak at 427 nm, with a bandwidth (measured as FWHM) of 10 nm; (iv) Tetrakis(2, 6-dichlorophenyl) porphyrin dissolved in toluene having an absorption peak at 419 nm with a bandwidth (measured as FWHM) of 12 nm; (v) Tetrakis(o-aminophenyl) porphyrin dissolved in toluene having an absorption peak at 420 nm with a bandwidth (measured as FWHM) of 30 nm; (vi) Tetramesitylporphyrin dissolved in toluene having an absorption peak at 427 nm with a bandwidth (measured as FWHM) of 1 nm; (vii) Zinc Tetramesitylporphyrin dissolved in toluene having an absorption peak at 420 nm with a bandwidth (measured as FWHM) of 12 nm; (viii) Zinc tetraphenylporphyrin, dissolved in toluene having an absorption peak at 423 nm with a bandwidth (measured as FWHM) of 14 nm. As can be seen from the respective absorption spectrums, these substances provide spectrums having absorption in a narrow bandwidth of FWHM of 10 to 30 nm thereby providing selective absorptive filters. The improved selectively provided by the use of such substances leads to a better reduction in undesirable visual distortion since a more selective target range can be inhibited. According to the target band of wavelengths to be inhibited the appropriate porphyrin may be selected.

Some porphryins have a particular example of being soluble in water such as Mg(II) meso-Tetra(4-sulfonatophenyl) porphine tetrasodium salt has an absorption wavelength in water of approximately 428 nm.

Porphyrins may be selected according to the intended use of the optical device. For example, the following porphyrins provide absorption peaks in the around 460 nm: manganese (III) 5,10,15,20-tetra(4-pyridyl)-21H,23H-porphine chloride tetrakis(methochloride) exhibits an absorption peak at 462 nm; 5,10,15,20-Tetrakis(4-sulfonatophenyl)-21H,23H-porphine manganese (III) chloride exhibits an absorption peak at 466 nm, 2,3,7,8,12,13,17,18-Octaethyl-21H,23H-porphine manganese(III) chloride exhibits an absorption peak at 459 nm. Use of such substances may be useful thus in inhibiting transmission of light of wavelength of 460 nm. Such wavelength has been shown to be detrimental to RGC on an in vitro model of glaucoma.

Zinc 5,10,15,20-tetra(4-pyridyl)-21H,23H-porphine tetrakis(methochloride) exhibits a peal absorption at 435 nm. Use of such substances may be useful thus in inhibiting transmission of light of wavelength of 435 nm. Such wavelength has been shown to be detrimental to RPE on an in vitro model of AMD.

Other applications or wavelength protection may be envisaged with other porphyrins: 5,10,15,20-Tetrakis(4-methoxyphenyl)-21H,23H-porphine cobalt(II) exhibits a first peak absorption at 417 nm and a second peak absorption 530 nm. Such a porphyrin may be used as a dual band absorptive filter to filter out wavelengths in the region of both of these absorption peaks or used for filtering out wavelengths for either of the absorption peaks. Similarly 5,10,15,20-Tetrakis(4-methoxyphenyl)-21H,23H-porphine exhibits a first peak absorption at 424 nm and a second peak absorption 653 nm.

5,10,15,20-Tetrakis(4-methoxyphenyl)-21H,23H-porphine iron (III) chloride exhibits an absorption peak at 421 nm. Zinc 5,10,15,20-tetra(4-pyridyl)-21H,23H-porphine tetrakis(methochloride) exhibits an absorption peak at 423 nm. 5,10,15,20-Tetrakis(1-methyl-4-pyridinio) porphyrin tetra (p-toluenesulfonate) exhibits an absorption peak at 421 nm. 5,10,15,20-Tetrakis(4-hydroxyphenyl)-21H,23H-porphine exhibits an absorption peak at 421 nm. 4,4',4'',4'''-(Porphine-5,10,15,20-tetrayl)tetrakis(benzoic acid) exhibits an absorption peak at 411 nm.

In further embodiments, other dyes or pigments including porphyrins may be selected according to the intended use of the optical device. In the case, for example of preventing melatonin suppression, one or more dyes or pigments having an absorption peak in a target band of 465 nm to 495 nm may be selected. Light having wavelengths in this band suppresses the production of Melatonin. Melatonin (N-acetyl-5-methoxytryptamine) is the principal hormone of the pineal gland, and controls many biological functions, particularly the timing of those physiological functions that are controlled by the duration of light and darkness. Thus optical devices having selective filtering means configured to inhibit transmission of light in this target band may be used to prevent melatonin suppression, particularly at night.

4-(Dicyanomethylene)2-methyl-6-(4-dimethylaminostyryl)-4H-pyran exhibits an absorption peak at 468 nm. 2-[4-(Dimethylamino)styrl]-1-methylpyridinium iodide exhibits an absorption peak at 466 nm.

3,3'-Diethyloxacarbocyanine iodide exhibits an absorption peak at 483 nm.

In the case, for example of compensating and restoring contrast in the red-green axis, one or more pigments or dyes including porphryins having an absorption peak in a target band of 550 nm to 660 nm, for example may be selected for inhibiting transmission of light in this target band.

In the case, for example of treatment or prevention of migraines, one or more pigments or dyes, including porphyrins, having an absorption peak in a target band of 590 nm to 650 nm, for example, and preferably 615-625 nm for inhibiting transmission of light in this target band.

In the case, for example of treatment of epilepsy or prevention of epileptic attacks, the selective interferential filter 120 may be configured to inhibit the transmission of wavelengths of light in a target band of 560 to 600 nm.

Figure 12:
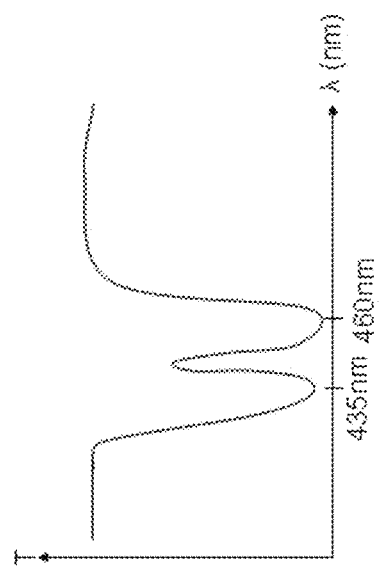
FIG. 12 graphically illustrates the transmission spectrum of a dual filter provided by one or more embodiments of the invention.

The absorptive filter of the fourth embodiment may be configured as a dual band filter that inhibits transmission of incident light, through the base optical substrate towards the eye 50 of a user, of light in two target bands of wavelengths, incident on the front surface of the 112 optical lens 100 while having minimum effect on the transmission of incident light of wavelengths outside the two selected wavelength bands. As illustrated in FIG. 12 a dual band filter may be provided which exhibits a low level of transmission within a first band of wavelengths, for example centered around of 435 nm as illustrated in the example and a second low level of transmission at a higher band for example centered around 460 nm while enabling transmission at a high level of transmittance of light at wavelengths between the two target bands.

Then absorption bandwidths of the substances described above are sufficiently narrow to enable such dual band filters to be provided. They may be provided by using two different substances exhibiting different absorption peaks or by a single substance having two or more different absorption peaks. Moreover a selective interferential filter of any of the previous embodiments may be combined with an absorptive filter of any of the embodiments to provide a dual band filter. The advantages of having two narrow distinct bands rather than two bands merging together are that distortion of colour vision and perturbation of scotopic vision can be minimised.

An optical device according to a fifth embodiment of the invention will be described with reference to FIG. 5. FIG. 5 is a schematic diagram of an optical lens 500 comprising a base optical substrate 510 having a first surface 511 and a second surface 512 similar to the base optical substrate of the first embodiment. The optical lens 500 further comprises a selective interferential filter 522 provided on the front surface 512 of the base optical substrate 510 and an absorptive filter 520 on the back surface 511 of the base optical substrate. In alternative embodiments the absorptive filter 520 may be included in the volume of the base optical substrate 510, for example incorporated within the base optical substrate 510 itself. The selective interferential filter 521 operates in the same way as the selective interferential filter 120 of the first embodiment and the absorptive filter 520 operates in a similar manner to the absorptive filter of the second embodiment. Both the selective interferential filter 522 and the absorptive filter 520 may be configured to inhibit transmission of light in the same target wavelength band. The advantage provided by this embodiment is that the selective interferential filter 522 may be added to the optical substrate to provide enhanced protection in the target wavelength band by enabling an overall increase in rejection factor in the target wavelength to be obtained. This enhanced protection may be adapted to the needs of the user, i.e. depending on whether or not the user suffers from a disease such as for example AMD, Stargardt disease, retinitis pigmentosa, Best's disease, Glaucoma, diabetic retinopathy or Leber's optic neuropathy or to what degree the user suffers from that disease. For example a first filter may provide a level of protection for normal preventive usage while the addition of a second filter may increase that level of protection to a therapeutic level for a subject suffering from the disease.

In an alternative embodiment the optical substrate may be provided with two absorptive filters. At least one of the absorptive filters may be added to the surface of the optical substrate to provide enhanced protection in the same target wavelength band as an absorptive filter provided on the other surface of the optical substrate or as a layer within the optical substrate. In further embodiments one of the absorptive filters may be added to the surface of the optical substrate to provide protection in a different target wavelength band as an absorptive filter provided on the other surface of the optical substrate or as a layer within the optical substrate. For example a protection in a target band relative to light detrimental to glaucoma, diabetic retinopathy or Leber's optic neuropathy may be provided by one absorptive filter and additional protection in a further target band relative to light detrimental to AMD, Stargardt disease, retinitis pigmentosa or Best's disease may be provided by another absorptive filter. Alternatively using filters with different target bands may enable colour balancing effects to be achieved.

Specific interferential filtering zones of the optical substrate (i.e. zones of the optical substrate provided with selective interferential filters) of an optical device according to embodiments of the invention can be defined in order to minimise the angular sensitivity of interferential filters and/or to significantly reduce colour distortion and light intensity attenuation in certain regions of the optical substrate. This is particularly important in the case when a selective interferential filter is applied to an optical lens such as an ophthalmic lens, a contact lens or an IOL. In the context of the present invention, by "ophthalmic lenses" is meant corrective and non-corrective lenses and also masks and other vision devices intended to be worn in front of the eyes. The ophthalmic lenses can provide specific functions, for example solar, antireflective, anti-smudge, anti-abrasive etc.

In some embodiments of the invention, the optical substrate may be provided with multiple filtering zones, for example in the case of monofocal ophthalmic lenses in the form of concentric circular zones from the center of the optical substrate to the periphery of the optical substrate. Moreover the rejection rate may differ from zone to zone.

An optical device according to a sixth embodiment of the invention will be described with reference to FIGS. 6A and 6B. FIG. 6A is a schematic diagram of an optical lens 600 comprising a base optical substrate 610 having a first surface 611 and a second surface 612. In the specific embodiment of an optical lens the first surface 611 is a concave back surface, disposed proximal to an eye 50 of a user in use and the second surface 612 is a convex front surface disposed in use distal to the eye 50 of the user. The front surface 612 has a number n of filtering zones 612-1 . . . 612-$n$ (where, in this embodiment n=4). Each filtering zone is provided with a respective selective interferential filter 620-1 . . . 620-$n$. Each selective interferential filter 620-1 . . . 620-$n$ operates as a band stop filter selectively inhibiting transmission, through the base optical substrate 610 towards the eye 50 of a user, of light in a target wavelength band, incident on the front surface 612 of the optical lens within the respective zone 612-1 . . . 612-$n$ while having little or no effect on the transmission of incident light of wavelengths outside the target wavelength band. Each selective interferential filter 620-1 . . . 620-$n$ is configured to inhibit the transmission of the selected target wavelength if the incident light is incident on the respective filtering zone 612_1-612_$n$ within a respective selected range of angles defined by a cone of angles. Moreover each selective interferential filter 620-1 . . . 620-$n$ is configured to inhibit the transmission of the target wavelength band at a respective rejection rate. The optical device may further comprise a protective film (not shown) positioned over the selective interferential filters 620-1 . . . 620-$n$ to provide mechanical and environmental protection. The protective film 630 may also be provided with an anti reflective coating for preventing the reflection of incident light in across the visible spectrum or within a selected band of the visible spectrum. In this embodiment, particularly adapted for monofocal ophthalmic lenses, a central filtering zone 612_1 is provided in the form of a circle while surrounding filtering zones 612_2 to 612_4 are provided as concentric annular rings surrounding the central zone 612_1 as illustrated in FIG. 6B.

In the example of FIG. 6B each of the selective interferential filters 620-1 . . . 620-$n$ are configured such that the respective selected range of angles of incidence is centered on an angle of incidence substantially normal to the interference patterns of the interference grating of the selective interferential filter 620-1 . . . 620-$n$. The interference patterns of the respective surrounding selective interferential filters 620-2 . . . 620-$n$ are inclined with respect to the interference patterns of the interference grating of the central selective interferential filter 620_1 based on the position of the respective surrounding zone 612_2, 612_3, 612,4 with respect to the central zone 612_1. i.e. the tilt angle of the interferential patterns of the selective interferential filters 620_1 to 620_4 increases as illustrated in FIG. 6B from the central zone towards the peripheral zone of the optical substrate. This means that each selective interferential filter 612_1 to 612_4 may be configured to operate in the target wavelength band for different ranges of angles of incidence.

Figure 6C:
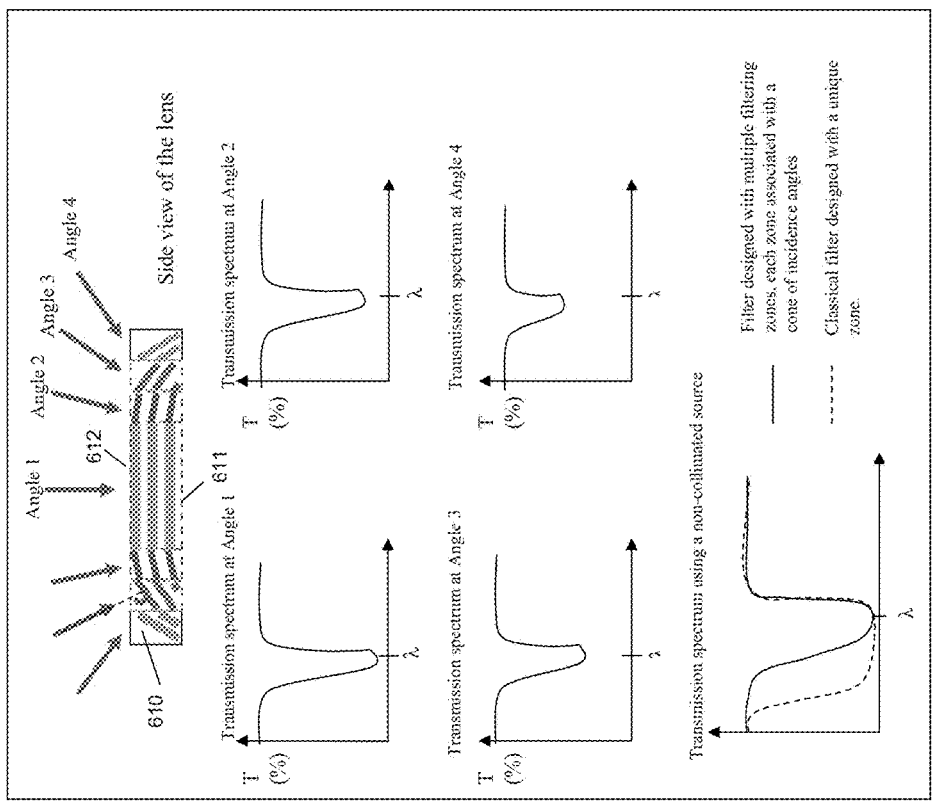

The selective interferential filter 620_1 provided for the central filtering zone 612_1 may be configured to have a higher rejection rate with respect to the rejection rate of the other selective interferential filters 620_2 to 620_4. The rejection rate of the other selective interferential filters 620_2 to 620_4 can be configured such that the rejection rate decreases from the central zone to the peripheral zone as illustrated in FIG. 6C. A filtering gradient from the center to the periphery of the optical substrate can thus be provided.

Designing an optical substrate with multiple filtering zones as described above minimizes the angular sensitivity of the band-stop filter as illustrated in FIG. 6C.

Each filtering zone of the optical substrate is preferentially associated with at least one line of sight and an associated cone of incidence angles. In particular, a spatially central zone of the lens generally corresponds to the primary gaze direction (line of sight when the user is looking at infinity straight ahead) of a user in central vision. In such a configuration, as illustrated in FIG. 7A, the incidence angles of incident light reaching the central part of the retina are close to 0°. As the eye rotates around the CRO, the line of sight moves away from the primary gaze direction and the angles of incidence increase as represented, for illustrative purposes, in FIG. 7B or in FIG. 7C.

Thus, the multiple filtering zones of the optical lens may be configured accordingly, each filtering zone being associated with a respective cone of incidence angles of incident light on the front surface (distal surface to user) of the optical substrate, in turn related to one or more lines of sight of the user. For each filtering zone of the example illustrated in FIG. 6B, the tilt angle of the interference fringes is calculated in such a way that the main incidence angle constitutes a normal angle to the interference grating. For each filtering zone in this example, the target wavelength band to be rejected remains the same. Decreasing the rejection rate for each filtering zone with the eccentricity of the respective filtering zone on the optical substrate also contributes to attenuation of color distortion.

While in the specific example illustrated in FIGS. 6A and 6B the surface of the optical lens is provided with 4 zones, it will be appreciated that the surface may be provided with any number of zones without departing from the scope of the invention.

Figure 8:
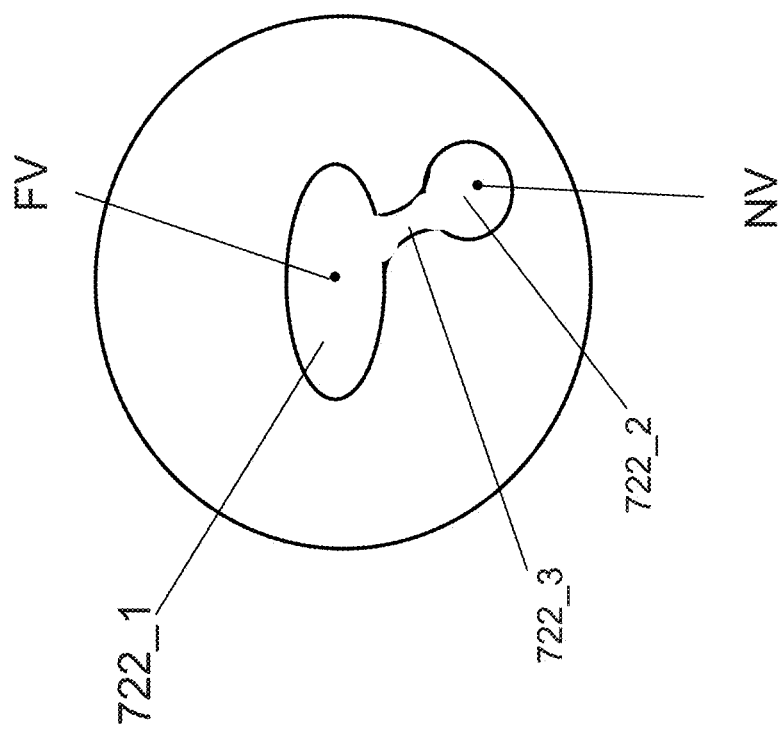
FIG. 8 is a schematic diagram of a progressive ophthalmic lens comprising an optical substrate in accordance with a further embodiment of the invention

For example, embodiments can be applied to different types of lenses, for example, multifocal lenses. A multifocal lens has at least two optical zones with different refractive powers which can be located and controlled, i.e. a far vision portion for viewing objects at a far distance and a near vision portion for viewing objects at a near distance. In a progressive multifocal lens the near portion and the far portion are linked by a progression corridor which corresponds to the path followed by the eye when it passes from one zone to the other zone enabling the eye to pass gently from far vision to near vision, thereby providing visual comfort for the wearer. The near vision portion and the far vision portion can each be associated with a reference point. The far vision reference point generally defines the intersection of the main line of sight with the lens while the near vision reference point generally defines the point of the principal meridian of progression for which the power of the lens corresponds to that required for near viewing. Thus in a particular embodiment of the invention as illustrated in FIG. 8, a first filtering zone 722_1 i.e. a first zone of the optical substrate provided with a selective filter, may be associated with a far vision portion of the ophthalmic lens and a second filtering zone 722_2 may be associated with a near vision portion. The first filtering zone is, preferably circular or oval in shape, essentially covering the zone around the far vision reference point FV, and the second filtering zone 722_2 preferably circular or oval in shape, covers the zone around the near vision reference point NV. In addition, a further zone 722_3 corresponding to the progression corridor, may be provided with a selective filter in accordance with any of the embodiments of the invention.

In the case of a progressive corrective ophthalmic lens, the diameter or the largest dimension of the central zone covering the far vision reference point is preferably comprised between 5 and 35 mm, in particular between 10 and 25 mm, and still more preferably approximately 20 mm.

The second filtering zone covering the near vision reference point is generally smaller than that corresponding to the far vision reference point. The diameter or the largest dimension of the second filtering zone covering the near vision reference point is advantageously comprised between 5 and 15 mm, preferably between 7 and 13 mm, and is in particular approximately 10 mm. The width of the band linking these two zones is advantageously comprised between 3 and 7 mm, preferably between 4 and 6 mm, and is in particular approximately 5 mm. In a particular embodiment of the invention, the band linking the first and second zone can optionally have a selective filter demonstrating inhibition of transmission in the same target band as the selective filters of either or both of the first or second filtering zones.

In a further embodiment of the invention a contact lens may be provided with one or more filtering zones, wherein the optical substrate composing the contact lens is provided with one or more interferential selective filters according to embodiments of the invention. A central circular zone of the optical substrate located at a geometrical center of the lens comprises a central circular area having a diameter of from 0.3 to 1 mm surrounded at one or two concentric rings, each zone having a width of about 0.1 mm to 1.25 mm may be provided with respective filtering means as described above.

A method for determining the configuration of one or more selective filters for an optical lens based on a particular user or utilisation in accordance with a particular embodiment of the invention will now be described.

Figure 9A:
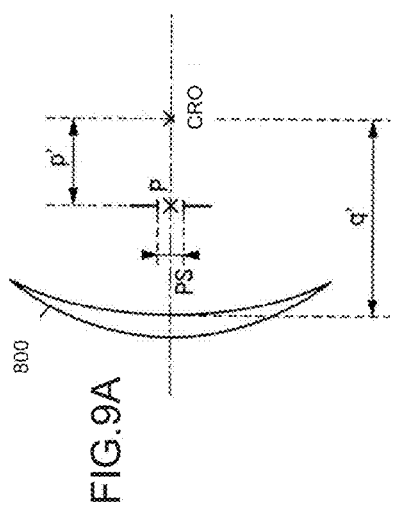
FIGS. 9A to 9C are schematic diagrams illustrating examples of lines of sight through an optical lens for configuring a range of angles of incidence.
Figure 9B:
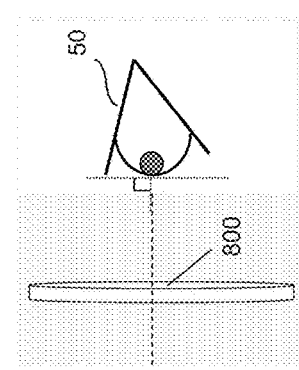

In an initial step, a first set of parameters defining at least one line of sight of the user, the distance between an eye of the user (from a point of reference of the eye such as the cornea apex or the center of rotation (CRO)) and a defined point on the optical substrate of the optical lens, such as on the back surface located proximal to the user. In the case of utilisation wherein the retina or part of the retina is to be protected, the size of the retina area centered on the fovea of the eye of the user and/or the pupil size of the user are also taken into consideration. For example, FIG. 9A illustrates some of the parameters that can be taken into account which include a distance q' from the CRO of the eye to a defined point on the back surface of optical lens 800, a distance p' between the pupil P and the CRO, and PS represents the size of the pupil.

As previously described in relation to FIG. 1E parameters of the optical lens may also be taken into account such as the geometry of the lens (including lens thickness, center prism), the surface equations defining the front and back surfaces of the lens, and the refractive index n of the optical substrate to enable the relation between the incidence angle of light incident on the front surface of the optical lens and the line of sight from the eye of the back surface of the optical lens to be considered.

In the case of an ophthalmic lens, the first set of parameters may include spectacle wearing parameters. Such wearing parameters include an eye-lens distance, pantoscopic tilt and wrap.

In general, the eye lens distance may be defined as the distance between a defined point of the back surface of the optical substrate and the center of rotation (CRO) of the eye or the cornea apex of the eye. The pantoscopic tilt of the lens is defined as the angle between the vertical and the line passing through the vertical edges of the lens fitted into the frame when the wearer is in a primary gaze position. The wrap defines the angle between the horizontal line and the line passing through the horizontal edges of the lens fitted into the frame. In general, the pantoscopic angle may be 8°, the wrap angle may be 7° and the cornea-lens distance is 12 mm Based on the first set of parameters, for each filtering zone, a cone of incidence angles is determined, and each filtering zone is numerically designed by considering all those incidence angles (modelling a non collimated lighting source) instead of being designed by considering only one incidence angle (modelling a collimated lighting source).

Figure 9C:
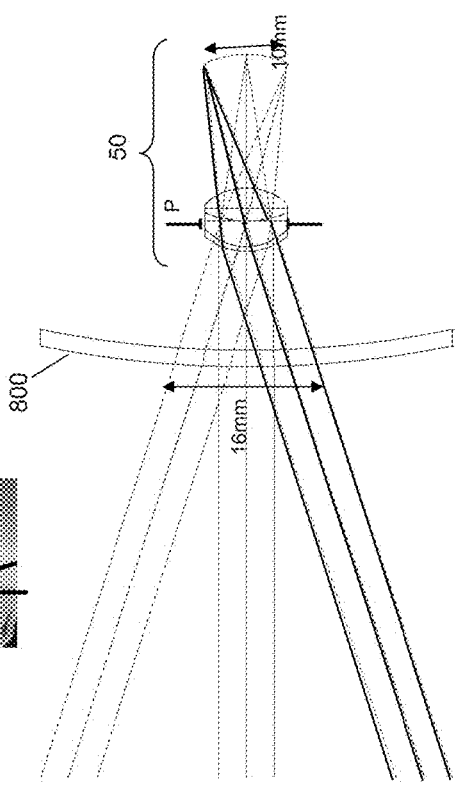

Illustrative exemplary results of cone of incidences were obtained using a Zemax model to model the features of an eye. For instance, in FIG. 9C, the ophthalmic lens is a monofocal lens with power equal to 0D. and having an refractive index of n=1,591, the pantoscopic angle is 0°, the wrap angle is 0°, the cornea-lens distance is 12 mm (p'=13 mm, q'=25 mm), the pupil diameter is 6 mm and the main line of sight corresponds to the primary gaze direction, that is to say $(\alpha,\beta)=(0°,0°)$. In this case, by choosing to protect a 10 mm diameter fovea-centered retinal zone in the vertical plane XY, it was determined that the cone of incidences in this plane is limited by $d\alpha'1=-18°$ and $d\alpha'2=+18°$, which corresponds to the peripheral angles of incidences $i'1=-$ 15.9° and i'2=+15.9°, which corresponds to a 16 mm diameter circle centered on the reference point of the optical lens (Y=0 mm) by considering the peripheral rays that go through the extremities of the pupil, as illustrated in FIG. 9C.

In the case where the zone of the retina to be protected is 4 mm, then the cone of incidences in the vertical plane is limited by dα'1=−7° and dα'2=+7°, which corresponds to the peripheral angles of incidences i'1=−6.1° and i'2=+6.1°, which corresponds to a 10.5 mm diameter circle centered on reference point of the optical lens (Y=0 mm). In the case where the zone of the retina to be protected is 4 mm and where the main line of sight is (α,β)=(20°,0°), meaning that the wearer rotates his eye of 20° downstairs, the cone of incidences is still limited by dα'1=−7° and dα'2=+7°, but which corresponds to the peripheral angles of incidences i'1=+9.7° and i'2=+21.5°, which corresponds to a zone on the lens starting from Y=−15.5 mm to Y=−4 mm on the optical lens. As mentioned before, the cone of incidences depends on a number of parameters of the optical substrate such as the geometry of the lens, particularly on its optical power (sphere, cylinder, axis, addition). Physiological parameters of the user may also be taken into account such as if the user suffers from a deterioration of the eye or is to be protected from a particular deterioration of the eye. For example, a selective filter for a user suffering from AMD, Stargardt disease, retinitis pigmentosa, Best's disease, diabetic retinopathy, Leber's optic neuropathy or Glaucoma will be configured to have a selected range of angles of incidence taking into account the size of the zone of the retina to be protected.

In another step of the method a second set of parameters characterising the range of wavelengths to be inhibited is provided in order to determine one or more target wavelength bands of light of which transmission is to be inhibited.

For example, if the intended use is for protecting the retina of an eye against phototoxic light, one or more selective filters may be configured to inhibit transmission of the light incident on the front surface of the optical device of wavelengths in a bandwidth in a range of from 10 nm to 70 nm, preferably 10 nm to 60 nm centered on a wavelength within a range of from 430 nm to 465 nm.

If the user suffers from a disease such as Glaucoma, diabetic retinopathy or Leber's optic neuropathy, one or more selective filters may be configured to inhibit the transmission of incident light in a target band having a bandwidth of 10-70 nm, preferably 15-25 nm centered on a wavelength of around 460 nm in order to provide enhanced protection and to slow down progress of these particular diseases.

If the user suffers from a disease such as AMD, Stargardt disease, retinitis pigmentosa or Best's disease, one or more selective filters may be configured to inhibit the transmission of incident light in a target band having a bandwidth of 10-70 nm, preferably 15-25 nm centered on a wavelength of around 435 nm in order to provide enhanced protection and to slow down progress of this particular disease.

For example if the user suffers from a sleep related disorder such as insomnia, jet lag, DSPS, ASPS, or changes of biological rhythms due to shift work and the like, one or more selective filters may be configured to inhibit the transmission of wavelengths of light in a target band of 465 nm to 495 nm centered on a wavelength of 480 nm for example to prevent melatonin suppression.

In the case of compensating and restoring contrast in the red-green axis for a user suffering from a colour vision disorder, one or more selective filters may be configured to inhibit the transmission of wavelengths of light in a target band of 550 nm to 660 nm, for example.

In the case of treatment or prevention of migraines, one or more selective filters may be configured to inhibit the transmission of wavelengths of light in a target band of 590 nm to 650 nm, for example, and preferably 615-625 nm.

In the case, for example, of treatment of epilepsy or prevention of epileptic attacks, one or more selective filters may be configured to inhibit the transmission of wavelengths of light in a target band of 560 to 600 nm.

The selective filters may be configured to be switchable so that inhibition of the target wavelength band may be switched on or off, or the rejection factor varied according to the time of day or the exposure to light.

Depending on the target wavelength bands the selective interferential filter as described above, may be configured accordingly, or the appropriate choice of absorptive material described above may be made.

The rejection rate of the selective filter in the target wavelength band(s) may be configured according to the utilisation envisaged and/or the level of protection required.

For example, for normal preventive utilisation for a user who does not suffer disease of the eye, a relatively low rate of rejection in the target wavelength band(s) may be configured, for example in the range of 30% to 50%. In the case of a user suffering from a disease of the eye such as glaucoma, diabetic retinopathy or Leber's optic neuropathy the level of rejection may be increased to a level in the range of from 80% to 100% for example.

The rejection rate may be adjusted by increasing the number of absorptive or interferential layers of the selective filters, or by adding further selective filters for example to one or both surfaces of the optical substrate. For example, a standard rejection rate in accordance with a normal preventive usage could be provided for a set of optical substrates in the form of unfinished lens, and then during a configuration phase an additional selective filter, absorptive or interferential, could be added to a surface of the optical substrate during manufacture of the optical lens from the unfinished lens if an enhanced level of rejection was required.

Moreover the transmittance of incident light outside the target wavelength band(s) can be configured according to the utilization required, for example according to whether or not solar protection is needed. In the case of solar protection, the transmittance across the entire visible spectrum of from 380 nm to 780 nm could be in the range of 8% to 100% for example, depending on the level of solar protection required such as class 0 to 3 as defined by International standards such as NF EN 1836+A1_2007E or ISO_DIS 12312-1E. An additional filtering (interferential and/or absorptive) is configured in the phototoxic target wavelength band of at least 5%. Table 1 summarises filter characteristics for sun glare filters used in solar protection, according to different filter categories as stated in ISO_DIS 12312-1E.

TABLE 1

Transmittance for sunglare filters for general use in solar protection.

| | | Requirements | | | | |
|---|---|---|---|---|---|---|
| | | Ultraviolet spectral range | | Visible spectral range | | Enhanced Infrared absorption[a] |
| Consumer Label | Technical Label | Maximum value of solar UV-B | Maximum value of solar UV-A | Range of luminous transmittance $\tau_V$ | | Maximum value |
| Descriptive label | Filter Category | transmittance $\tau_{SUVB}$ 280 nm to 315 nm | transmittance $\tau_{SUVA}$ 315 nm to 380 nm | from over % | to % | of solar IR transmittance $\tau_{SIR}$ |
| Light tint | 0 | 0.05 $\tau_V$ | $\tau_V$ | 80.0 | 100 | $\tau_V$ |
| sunglasses | 1 | 0.05 $\tau_V$ | $\tau_V$ | 43.0 | 80 | $\tau_V$ |
| General purpose sunglasses | 2 | 1.0% absolute or 0.05 $\tau_V$ whichever is greater | 0.5 $\tau_V$ | 18.0 | 43.0 | $\tau_V$ |
| | 3 | 1.0% absolute | 0.5 $\tau_V$ | 8.00 | 18.0 | $\tau_V$ |
| Very dark special purpose sunglasses | 4 | 1.0% absolute | 1.0% absolute or 0.25 $\tau_V$ whichever is greater | 3.00 | 8.00 | $\tau_V$ |

[a]Only applicable to sunglare filters recommended by the manufacturer as a protection against infrared radiation
NOTE
The upper limit of UV-A at 380 nm coincides with that taken in ophthalmic optics and in ISO 20473: 2007, Optics and photonics-Spectral bands Examples of specific configurations are as follows for a normal prevention use for example against phototoxic light in the first selected range of wavelengths, the selective filter (interferential and/or absorptive) may be configured to inhibit light in a target band centered on 435 nm, 460 nm or 445 nm with a bandwidth of 20 nm to 60 nm with a rejection rate in the range of from 30% to 50%.

For a therapeutic use, the selective filter (interferential and/or absorptive) may be configured to inhibit light in a target band centered on 435 nm, 460 nm or 445 nm with a bandwidth of 20 nm to 60 nm with a rejection rate in the range of from 80% to 100%

For a solar and preventive use, the optical device may be configured to enable transmittance of visible light across the entire visible spectrum at 8% to 60% i.e. at an inhibition rate of 92% to 40%. The selective filter (interferential and/or absorptive) may be configured to inhibit light in a target band centered on 435 nm, 460 nm or 445 nm with a bandwidth of 25 nm to 60 nm, preferably of from 25 nm to 35 nm at an additional inhibition rate of at least 5% in addition to the inhibition rate of visible light across the entire visible spectrum.

A lens production system for producing an optical lens according to any of the embodiments of the invention may include a lens ordering system including a computer terminal at a lens ordering side such as at an opticians or linked to a lens ordering internet site and a second terminal at a lens manufacturing side with the two terminals being linked by data communication links. Information relative to the optical lens order, such as prescription values and other information required for the design and manufacture of a lens; In particular information relating to the configuration of selective filtering means as described above can be sent to the lens manufacturing side from the lens ordering side. For example the type of light to be inhibited and the degree of protection required etc.

Manufacture of an optical lens may comprise the steps of providing an unfinished lens having a finished curved surface and an unfinished surface. The finished curved surface may be concave (back surface in the case of an ophthalmic lens) or convex (front surface in the case of an ophthalmic lens). Typically the unfinished surface is a concave back surface. The unfinished lens may already be provided with one selective filter, either within the optical substrate of the unfinished lens or on a finished surface of the unfinished lens, and a further selective filter may be configured and added to the unfinished or finished surface, if required, to enhance protection, or to provide another function, as described previously. In a preferred embodiment the unfinished surface is surfaced prior to the addition of a selective interferential filter to the optical lens. In other cases the unfinished lens may not yet be provided with any selective filter and the manufacturing process may further include configuring a selective filter and incorporating the configured selective filter, into or onto an unfinished substrate prior to surfacing, to provide a finished lens. The manufacturing process may also include the step of adding a prescription to the unfinished surface according to the corrective requirements for the user. Processes for the manufacture of lens are described, for example in U.S. Pat. No. 6,019,470 or U.S. Pat. No. 8,002,405.

Determination of the position of the one or more filtering zones provided with selective filters on the surface of the optical may be determined with reference to standard manufacturing markings provided as micro-engravings on the surface of the lens including prism reference points (BP) for facilitating control of prismatic power; centering crosses (+) for positioning the lens in front of the eye and for correction insertion of the lens in spectacle frames; distance reference points (BF) and near reference points (BN).

The finished surface, in the case where the finished surface is a convex front surface for an ophthalmic lens, may be a spherical, rotationally symmetrical spherical surface, a progressive surface, a toric surface, an atoric surface or a complex surface.

While some specific embodiments have been described above in the context of an ophthalmic lens it will be appreciated that the invention may be applied to other optical substrates used as windows, automotive and aircraft windshields, films, ophthalmic instrumentation, computer monitors, television screens, telephone screens, multimedia display screens, lighted signs, light projectors and light sources, other ophthalmic devices and the like without departing from the scope of the invention. The ophthalmic devices may include eye glasses, sun glasses, goggles, contact lenses, IOL's and ophthalmic lenses.

Any of the embodiments of the invention described may be used to prevent vision-related discomfort being suffered by user. An optical substrate according to any of the embodiments of the invention may be used in windows, automotive and aircraft windshields, films, ophthalmic instrumentation, computer monitors, television screens, telephone screens, multimedia display screens, lighted signs, light projectors and light sources, other ophthalmic devices and the like for inhibiting transmission of phototoxic light in the first selected range of wavelengths to the eye of a user.

Optical devices comprising optical substrates according embodiments of the invention may be used in particular in preventing vision-related discomfort in a user or in therapy for providing a protection to slow down the progression of disease.

Particular embodiments of the invention may be used in protecting at least part of an eye of a user from phototoxic light in the first selected range of wavelengths. For example optical devices may be used in protecting, from phototoxic light, at least part of an eye of a user suffering from a deterioration of the eye, in particular due to a degenerative mechanism of oxidative stress type such as glaucoma, diabetic retinopathy, Leber's hereditary optic neuropathy, Age related Macular Degeneration (AMD), Stargardt disease, retinitis pigmentosa, or Best's disease. For example, an optical device according to any embodiment of the invention may be used in protecting, from phototoxic light, at least part of an eye of a user suffering from glaucoma, diabetic retinopathy, or Leber's hereditary optic neuropathy, wherein the first selected range of wavelengths is centered on a wavelength of substantially 460 nm.

Separately or in combination with the previous example, an optical device according to embodiments of the invention may be used in protecting, from phototoxic light, at least part of an eye of a user suffering from Age related Macular Degeneration (AMD), Stargardt disease, retinitis pigmentosa or Best's disease wherein the first selected range of wavelengths is centered on a wavelength of substantially 435 nm.

Thus the progress of the disease can be slowed down by providing enhanced protection.

In some embodiments an optical device according to embodiments of the invention may be used in the avoidance of disturbance of sleep and disruption of circadian rhythms due to lighting or screens rich in chronobiological light.

In other embodiments, an optical device according to embodiments of the invention may be used in preventing light induced melatonin suppression when the first selected range of wavelengths is 465-495 nm. In this way, treatment involving reducing exposure to specific wavelengths of light, before sleep often referred to as dark therapy, may be provided for subjects suffering from insomnia, sleep deprivation, jet lag, detrimental effects on sleeping due to night shift work, or other sleep related effects. Night therapy using optical devices configured in this way may be used in combination with light therapy to reset circadian rhythms in the case of DSPS or ASPS (delayed or advances sleep phase syndrome), or other sleep related disorders.

In further embodiments an optical device according to embodiments of the invention may be used in the treatment of epilepsy or prevention of epileptic attacks when the first selected range of wavelengths is centered on a wavelength of substantially 580 nm, for example a target wavelength band of 560-600 nm.

In yet further embodiments, an optical device according to embodiments of the invention may be used to compensate and restore contrast in the red-green axis, when the first selected range of wavelengths is centered on a wavelength of substantially 575 nm, for example a target wavelength band of 550-600 nm.

In even further embodiments, an optical device according to embodiments of the invention may be used in the treatment or prevention of migraines, when the first selected range of wavelengths a target wavelength band of 590-650 nm, preferably 615-625 nm.

The user may be provided with ophthalmic lenses, contact lenses, IOLs, goggles (for example night goggles), protective filters for computer screens or windows and the like to help to slow down the progression of the disease.

Although the present invention has been described herein above with reference to specific embodiments, the present invention is not limited to the specific embodiments, and modifications will be apparent to a skilled person in the art which lie within the scope of the present invention.

For example the invention is not restricted to the target wavelength bands described, further examples may be envisaged for different applications.

Further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of determining a configuration of interferential filtering means for an optical device in order to customize the optical device for a user of the optical device, the method comprising:
   receiving as input, specific with respect to the user, a first set of parameters representative of
   i) at least one main line of sight of the user,
   ii) a distance between an optical substrate of the optical device and an eye of the user, and
   iii) a size of a retinal area to be protected of a retina of the eye of the user, the size of the retinal area being less than an entire retina;
   determining a first selected range of angles of incidence based on the first set of parameters specific to the user;
   providing a second set of parameters characterizing, specific with respect to the user, a range of wavelengths to be at least partially inhibited;
   determining a first selected range of wavelengths of incident light to be inhibited by the optical device, at least partially, based on the second set of parameters specific to the user; and
   configuring a first selective interferential filtering means and a first zone of a surface of the optical substrate, based on the determined first selected range of angles of incidence and the determined first selected range of wavelengths, such that the first selective interferential filtering means is operable to inhibit, at a first rate of rejection, transmission of the determined first selected range of wavelengths of incident light incident on the first zone within the determined first selected range of angles of incidence, thereby to customize the optical device to the user, wherein the step of determining a first selected range of angles of incidence includes defining said range of angles by all incidence angles between the incidence angles of peripheral rays of light that reach borders of the retinal area of the eye of the user, wherein the first set of parameters are directed to protect the retinal area of the eye of the user, and the angles of incidence are determined in relation to the retinal area to be protected and without incorporating a portion outside of the retinal area to be protected.

2. The method according to claim 1, wherein the first and/or second set of parameters further comprises physiological parameters of the user.

3. The method according to claim 2, wherein the physiological parameters of the user include any of whether the user suffers from a deterioration of the eye or is to be protected from a deterioration of the eye.

4. The method according to claim 1, further comprising:
providing at least one further first set of parameters representative of
  i) at least one further main line of sight of the user,
  ii) the distance between the optical substrate and the eye of the user, and
  iii) the size of at least one of a retina area centered on a fovea of the eye of the user and the pupil size of the eye of the user;
determining, for each further first set of parameters, a respective selected range of angles of incidence based on the respective further first set of parameters;
providing at least one further second set of parameters characterizing, for the user, at least one further range of wavelengths to be at least partially inhibited;
determining, for each further second set of parameters, a respective selected range of wavelengths of incident light to be inhibited, at least partially, based on the respective further second set of parameters; and
for each further first set of parameters and further second set of parameters:
  configuring a respective further selective interferential filtering means and a respective further zone of the surface of the optical substrate based on the respective selected range of angles of incidence and the respective selected range of wavelengths such that the respective further selective interferential filtering means is operable to inhibit, at a respective further rate of rejection, transmission of the respective selected range of wavelengths of incident light, incident on the respective further zone within the respective selected range of angles of incidence.

5. The method according to claim 4, wherein each respective selected range of angles of incidence is different to the first selected range of angles of incidence.

6. The method according to claim 4, wherein each respective selective range of wavelengths is substantially the same as the first selected range of wavelengths.

7. The method according to claim 1, wherein the first rate of rejection is in a range of from 10% to 100%.

8. The method according to claim 4, wherein each further rate of rejection is different to the first rate of rejection.

9. The method according to claim 4, wherein the optical device is an optical lens, the method further comprising configuring the first zone to correspond to a distance vision portion of the optical lens for a wearer and a further zone to correspond to a near vision portion of the optical lens for a wearer.

10. The method according to claim 1, further comprising configuring each selective interferential filtering means to inhibit transmission of incident light by at least one of reflection, refraction and diffraction.

11. The method according to claim 1, wherein the first selected range of wavelengths has a bandwidth in a range of from 10 nm to 70 nm.

12. The method according to claim 11, wherein the first selected range of wavelengths has a bandwidth in a range of from 20 nm to 60 nm, and the first rate of rejection is in a range of from 10 to 50%.

13. The method according to claim 11, wherein the first selected range of wavelengths has a bandwidth in a range of from 15 nm to 30 nm, and the first rate of rejection is in a range of from 60 to 100%.

14. The method according to claim 11, wherein the optical device is configured to inhibit transmission of visible light across the entire visible spectrum at an inhibition rate in a range of from 40% to 92%, the first selected range of wavelengths has a bandwidth in a range of from 25 nm to 60 nm, and the first rate of rejection is configured to provide at least 5% additional inhibition for the first selected range of wavelengths.

15. The method according to claim 1, wherein the first selected range of wavelengths is of from 465 nm to 495 nm.

16. The method according to claim 1, wherein the first selected range of wavelengths is of from 550 nm to 660 nm.

17. The method according to claim 1, wherein the first selected range of wavelengths is of from 590 nm to 650 nm.

18. The method according to claim 1, wherein the first selected range of wavelengths is of from 560 nm to 600 nm.

19. A method of manufacturing an optical lens, the method comprising the steps of:
providing a semi-finished optical lens having an unfinished surface and an opposing surface, wherein the unfinished surface is one of a convex surface and a concave surface and the opposing surface is the other of a convex surface and a concave surface;
determining a configuration of a selective interferential filtering means for the optical lens for a user;
surfacing the unfinished surface;
providing one of the surfaces with the selective interferential filtering means; and
wherein the step of determining a configuration of the selective interferential filtering means comprises a method of determining configuration of selective interferential filtering means according to claim 1.

20. The method according to claim 5, wherein each respective selective range of wavelengths is substantially the same as the first selected range of wavelengths.

21. The method according to claim 5, wherein the optical device is an optical lens, the method further comprising configuring the first zone to correspond to a distance vision portion of the optical lens for a wearer and a further zone to correspond to a near vision portion of the optical lens for a wearer.

22. The method according to claim 7, wherein the first rate of rejection is in a range of 30% to 100%.

23. The method according to claim 11, wherein the first selected range has a bandwidth in a range of 10 nm to 60 nm centered on a wavelength within a range of between 430 nm and 465 nm.

24. The method according to claim 12, wherein the first selected range of wavelengths has a bandwidth in a range of from 20 nm to 25 nm centered on a wavelength of one of 435 nm, 445 nm and 460 nm.

25. The method according to claim 12, wherein the first rate of rejection is in a range of from 30 to 50%.

26. The method according to claim 13, wherein the first selected range of wavelengths has a bandwidth in a range of 15 nm to 25 nm centered on a wavelength of one of 435 nm, 445 nm and 460 nm.

27. The method according to claim 13, wherein the first rate of rejection is in a range of from 80 to 100%.

28. The method according to claim 14, wherein the first selected range of wavelengths has a bandwidth in a range of from 25 nm to 35 nm centered on a wavelength of one of 435 nm, 445 nm and 460 nm.

29. The method according to claim 17, wherein the first selected range of wavelengths is of from 615 nm to 625 nm.

30. The method according to claim 1, wherein the step of providing a first set of parameters also includes a pupil size of the eye of the user.

31. The method according to claim 3, wherein the deterioration of the eye is due to a degenerative mechanism of oxidative stress type.

* * * * *